United States Patent
Guo et al.

(10) Patent No.: US 12,301,502 B2
(45) Date of Patent: May 13, 2025

(54) RESOURCE MAPPING FOR TRANSMITTING SIDELINK CONTROL INFORMATION

(71) Applicant: Huawei Technologies Co., Ltd., Shenzhen (CN)

(72) Inventors: Wenting Guo, Shanghai (CN); Jinfang Zhang, Shenzhen (CN); Hongjia Su, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/651,134

(22) Filed: Feb. 15, 2022

(65) Prior Publication Data

US 2022/0173870 A1    Jun. 2, 2022

Related U.S. Application Data

(63) Continuation of application No. PCT/CN2020/107095, filed on Aug. 5, 2020.

(30) Foreign Application Priority Data

Aug. 16, 2019  (CN) .................. 201910760401.X

(51) Int. Cl.
*H04L 5/00* (2006.01)
*H04W 4/40* (2018.01)
(Continued)

(52) U.S. Cl.
CPC ....... *H04L 5/0053* (2013.01); *H04W 72/0446* (2013.01); *H04W 72/20* (2023.01); *H04W 4/40* (2018.02)

(58) Field of Classification Search
CPC ... H04L 5/0053; H04L 1/0072; H04L 5/0023; H04L 5/0078; H04L 5/0094; H04L 1/001;
(Continued)

(56) References Cited

U.S. PATENT DOCUMENTS

2010/0183101 A1* 7/2010 Mundarath ........... H04L 1/0048
                                                        375/341
2016/0212042 A1* 7/2016 Kwon .................. H04L 1/0072
(Continued)

FOREIGN PATENT DOCUMENTS

CN  107734548 A  2/2018
CN  107846373 A  3/2018
(Continued)

OTHER PUBLICATIONS

U.S. Appl. No. 62/804,664, filed Feb. 12, 2019 (Year: 2019).*
(Continued)

*Primary Examiner* — Sun Jong Kim
(74) *Attorney, Agent, or Firm* — Slater Matsil, LLP

(57) ABSTRACT

A communication method and apparatus are provided, and are applicable to fields such as V2X, internet of vehicles, intelligent connected vehicles, assisted driving, and intelligent driving. The method includes: A first terminal device may map first control information to a first transmission resource, and map second information including second control information and data to a second transmission resource and a third transmission resource, and may map the second information to the second transmission resource that does not overlap the first transmission resource in time domain.

17 Claims, 16 Drawing Sheets

Control channel     Data channel

(51) Int. Cl.
  *H04W 72/0446* (2023.01)
  *H04W 72/20* (2023.01)

(58) Field of Classification Search
  CPC ............ H04L 5/0064; H04W 72/0446; H04W 72/20; H04W 4/40; H04W 92/18; H04W 72/535; H04B 7/0413
  See application file for complete search history.

(56) References Cited

U.S. PATENT DOCUMENTS

| | | | |
|---|---|---|---|
| 2019/0089564 | A1 | 3/2019 | Blasco Serrano et al. |
| 2019/0215817 | A1 | 7/2019 | Chae et al. |
| 2019/0246385 | A1 | 8/2019 | Lin et al. |
| 2020/0260472 | A1* | 8/2020 | Ganesan ............... H04W 4/46 |
| 2021/0127361 | A1* | 4/2021 | Yasukawa .............. H04W 4/70 |
| 2022/0104203 | A1* | 3/2022 | Lin ..................... H04W 52/383 |
| 2022/0353846 | A1* | 11/2022 | Wang ................ H04W 72/0446 |

FOREIGN PATENT DOCUMENTS

| | | |
|---|---|---|
| CN | 109075908 A | 12/2018 |
| CN | 109219015 A | 1/2019 |
| CN | 109644111 A | 4/2019 |
| CN | 109691003 A | 4/2019 |
| WO | 2017110960 A1 | 6/2017 |
| WO | 2018201384 A1 | 11/2018 |
| WO | 2019138499 A1 | 7/2019 |

OTHER PUBLICATIONS

"Discussion on physical layer structure for NR sidelink" 3GPP TSG RAN WG1 #97, Reno, USA, May 13-17, 2019 (R1-1907012) (Year: 2019).*

"Sidelink physical layer structure for NR V2X" 3GPP TSG RAN WG1 Meeting #97, Reno, USA, May 13-17, 2019 (R1-1906007) (hereinafter "3GPP2") (Year: 2019).*

Futurewei, "Two-stage SCI design and adaptive DMRS support for sidelink", 3GPP TSG RAN WG1 Meeting #98, R1-1908737, Aug. 26-30, 2019, 8 Pages, Prague, Czech Republic.

Huawei, et al., "Sidelink physical layer structure for NR V2X", 3GPP TSG RAN WG1 Meeting #97, R11906007, May 13-17, 2019, 20 Pages, Reno, USA.

OPPO, "Discussion on resource allocation in NR-V2X", 3GPP TSG-RAN WG1 Meeting #94, R1-1808906, Aug. 20-24, 2018, 4 Pages, Gothenburg, Sweden.

"Detailed specifications of the terrestrial radio interfaces of International Mobile Telecommunications-Advanced (IMT-Advanced)", Preliminary Draft Revision of Recommendation ITU-R M.2012-3, 31st Meeting of Working Party 5D, Oct. 9-16, 2018, 183 Pages, Fukuoka, Japan.

"3rd Generation Partnership Project; Technical Specification Group Radio Access Network; NR; Multiplexing and channel coding (Release 15)", 3GPP TS 38.212 V15.6.0, Technical Specification, Jun. 2019, 101 Pages.

"3rd Generation Partnership Project; Technical Specification Group Radio Access Network; NR; Physical layer procedures for data (Release 15)", 3GPP TS 38.214 V15.6.0, Technical Specification, Jun. 2019, 105 Pages.

"3rd Generation Partnership Project; Technical Specification Group Radio Access Network; NR; Physical layer procedures for control (Release 15)", 3GPP TS 38.213 V15.6.0, Technical Specification, Jun. 2019, 107 Pages.

"3rd Generation Partnership Project; Technical Specification Group Radio Access Network; Evolved Universal Terrestrial Radio Access (E-UTRA); Physical channels and modulation (Release 13)", 3GPP TS 36.211 V13.11.0, Technical Specification, Jun. 2019, 174 Pages.

"3rd Generation Partnership Project; Technical Specification Group Radio Access Network; NR; Radio Resource Control (RRC) protocol specification (Release 15)", 3GPP TS 38.331 V15.6.0, Technical Specification, Jun. 2019, 519 Pages.

"3rd Generation Partnership Project; Technical Specification Group Radio Access Network; NR; Physical channels and modulation (Release 15)", 3GPP TS 38.211 V15.6.0, Technical Specification, Jun. 2019, 97 Pages.

Ericsson, "PHY layer structure for NR sidelink", 3GPP TSG-RAN WG1 Meeting #97, R1-1907134, May 13-17, 2019, 22 Pages, Reno, Nevada.

Huawei, et al., "Sidelink physical layer structure for NR V2X", 3GPP TSG RAN WG1 Meeting #98, R1-1908039, Aug. 26-30, 2019, 32 Pages, Prague, Czech Republic.

Huawei, et al., "Sidelink physical layer structure for NR V2X", 3GPP TSG RAN WG1 Meeting #97, R1-1906007, May 13-17, 2019, 18 Pages, Reno, USA.

Huawei, et al., "PSFCH formats for NR V2X", 3GPP TSG RAN WG1 Meeting #96bis, R1-1905899, Apr. 8-12, 2019, 5 Pages, Xi'an, China.

LG Electronics, "Discussion on physical layer structure for NR sidelink", 3GPP TSG RAN WG1 #97, R1-1907012, May 13-17, 2019, 25 Pages, Reno, USA.

Media Tek Inc., "Discussion on sidelink physical layer structure", 3GPP TSG RAN WG1 #97, R1-1906553, May 13-17, 2019, 16 Pages, Reno, USA.

Panasonic, "Discussion on physical layer structure for sidelink in NR V2X", 3GPP TSG RAN WG1 #97, R1-1906402, May 13-17, 2019, 6 Pages, Reno, USA.

Samsung, "Feature lead summary#3 for 7.2.4.1 Physical layer structure for sidelink", 3GPP TSG RAN WG1 #97 Meeting, R1-1907822, May 13-17, 2019, 27 Pages, Reno, USA.

Samsung, "Feature lead summary#2 for 7.2.4.1 Physical layer structure for sidelink", 3GPP TSG RAN WG1 #97 Meeting, R1-1907755, May 13-17, 2019, 26 Pages, Reno, USA.

NTT Docomo et al:"NR Sidelink Physical Layer Structure." 3GPP TSG RAN WG1 #97, R1-1906205. May 13-17, 2019. total 12 pages.

Qualcomm Incorporated:"Considerations on Physical Layer aspects of NR V2X." 3GPP TSG RAN WG1 Meeting #96, R1-1902994. Feb. 25-Mar. 1, 2019. total 18 pages.

Samsung:"Feature lead summary#2 for 7.2.4.1 Physical layer structure for sidelink." 3GPP TSG RAN WG1 #96bis Meeting, R1-1905725. Apr. 8-12, 2019. total 24 pages.

\* cited by examiner

RESOURCE MAPPING FOR TRANSMITTING SIDELINK CONTROL INFORMATION

CROSS-REFERENCE TO RELATED APPLICATIONS

This application is a continuation of International Application No. PCT/CN2020/107095, filed on Aug. 5, 2020, which claims priority to Chinese Patent Application No. 201910760401.X, filed on Aug. 16, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a network of a long term evolution (LTE) technology proposed in the 3rd generation partnership project (3GPP), an internet-of-vehicles technology for vehicle-to-everything (V2X) communication is proposed. The V2X communication is communication between a vehicle and anything outside, and includes a plurality of application scenarios, such as vehicle to vehicle (V2V) communication, vehicle to pedestrian (V2P) communication, vehicle to infrastructure (V2I) communication, and vehicle to network (V2N) communication.

In existing LTE V2X communication, a resource mapping manner shown in FIG. 1 is used. A resource for one transmission includes one sub-channel or a plurality of consecutive sub-channels in frequency domain, and includes one subframe in time domain. A physical sidelink control channel (PSCCH) occupies two consecutive RBs with lowest sequence numbers in frequency domain, and is used for transmission of control information, such as sidelink assignment (SA) information. A sidelink physical shared channel (PSSCH) occupies a remaining RB in a sub-channel in a frequency division manner, and is used for transmission of data information. In this resource mapping manner, a size of a physical resource occupied by a PSCCH channel is fixed, and one transmission of data is accompanied by one transmission of control information. A receive end performs blind detection on all possible control channels in an entire frequency domain range by using a sub-channel as a granularity, and decodes a data channel based on correctly decoded control information, to obtain data information.

In NR V2X communication, because a frame structure changes, and a length of control information is variable to support more service types, the foregoing resource mapping manner is no longer applicable.

SUMMARY

Embodiments of this application provide a communication method and apparatus, to provide a resource mapping manner that supports a variable length of control information, so as to reduce overheads of a control channel.

According to a first aspect, an embodiment of this application provides a communication method. The method may be applied to a first terminal device, and the method includes: A first terminal device generates first control information and second information, where the second information includes data and/or second control information, and the second control information is located at a forepart of the second information. The first terminal device maps the first control information to a first transmission resource. The first terminal device maps the second information to a second transmission resource and a third transmission resource, and preferentially maps the second information to the second transmission resource, and the first terminal device sends the first control information and the second information to a second terminal device. The first transmission resource, the second transmission resource, and the third transmission resource are located in a same scheduling unit, the second transmission resource and the first transmission resource do not overlap in time domain, and the third transmission resource and the first transmission resource overlap in time domain but do not overlap in frequency domain.

According to the technical solution provided in this application, the first terminal device may map the second information including the second control information and the data to the second transmission resource and the third transmission resource, and may preferentially map the second information to the second transmission resource that does not overlap the first transmission resource in time domain. In this way, the second control information can be sent at high transmit power, so as to enhance reliability. In addition, because the second control information is located at a forepart of the second information, a decoding delay can be effectively reduced.

With reference to the first aspect, in a first possible design of the first aspect, that a first terminal device generates first control information and second information may include: The first terminal device generates the first control information, the second control information, and the data. The first terminal device concatenates the second control information and the data to form the second information. In this way, the second information in this embodiment of this application may be obtained by concatenating the second control information and the data. Further, because the second control information is located at the forepart of the second information, the first terminal device may concatenate the second control information before the data.

With reference to the first aspect, in a first possible design of the first aspect, that the first terminal device maps the second information to a second transmission resource and a third transmission resource may include: The first terminal device performs layer mapping, multiple-input multiple-output MIMO coding, and resource mapping on the second information together, and maps the second information to the second transmission resource and the third transmission resource. In this way, it can be learned that the layer mapping, the MIMO coding, and the resource mapping are together performed after the second control information and the data are concatenated, so that the second control information can be multiplexed onto a data channel on which the data is located, and the second control information can be received and demodulated by using a DMRS of the data channel, to enhance the reliability.

With reference to the first aspect, in a first possible design of the first aspect, that the first terminal device maps the second information to a second transmission resource and a third transmission resource may further include: The first terminal device maps the second information to the second transmission resource and the third transmission resource first in frequency domain and then in time domain and in ascending order of sequence numbers of resource blocks and sequence numbers of symbols.

With reference to the first aspect, in a first possible design of the first aspect, the first terminal device may further map the second information to a fourth transmission resource, where the fourth transmission resource is a transmission resource on a 1st symbol in the scheduling unit and is located before the first transmission resource. For example, the first terminal device may map the second information to the fourth transmission resource when the first transmission resource does not include the 1st symbol in the scheduling unit. In this case, a sequence of mapping the second information by the first terminal device is: first mapping to the second transmission resource, then mapping to the fourth transmission resource, and finally mapping to the third transmission resource.

With reference to the first aspect, in a first possible design of the first aspect, the first transmission resource occupies an $n^{th}$ symbol to an $(n+k)^{th}$ symbol in the scheduling unit, a time domain start symbol of the second transmission resource is an $(n+k+1)^{th}$ symbol in the scheduling unit, n is 0 or 1, and k is a positive integer. In this way, the first transmission resource may be adjacent to the second transmission resource in time domain. Considering that the second control information is located at the forepart of the second information, the second terminal device may determine that the second control information is mapped to a $1^{st}$ symbol after the first transmission resource, so that indication information of a position, in the second transmission resource, of a transmission resource occupied by the second control information can be reduced.

With reference to the first aspect, in a first possible design of the first aspect, the first control information may include information used to indicate a size of a transmission resource occupied by the second control information, for example, may be an aggregation level of a second-stage control channel on which the second control information is located. In this embodiment of this application, a length of the second control information may be variable, and may be sent at different bit rates. The size of the transmission resource occupied by the second control information may be indicated by using the first control information, so that overheads of a control channel can be reduced.

According to a second aspect, an embodiment of this application provides a communication apparatus. The communication apparatus has a function of implementing the first terminal device in any one of the first aspect or the possible designs of the first aspect. The communication apparatus may be a handheld terminal device, an in-vehicle terminal device, or vehicle user equipment, or may be an apparatus included in a terminal device, for example, a chip, or an apparatus including the terminal device. A function of the foregoing terminal device may be implemented by hardware, or may be implemented by hardware by executing corresponding software. The hardware or the software includes one or more modules corresponding to the foregoing function.

In a possible design, a structure of the communication apparatus includes a processing module and a transceiver module. The processing module is configured to support the communication apparatus in performing a corresponding function of the first terminal device in any one of the first aspect or the designs of the first aspect. The transceiver module is configured to support communication between the communication apparatus and another communication device. For example, when the communication apparatus is the first terminal device, the communication apparatus may send first control information and second information to a second terminal device. The communication apparatus may further include a storage module. The storage module is coupled to the processing module, and stores program instructions and data that are necessary for the communication apparatus. In an example, the processing module may be a processor, a communication module may be a transceiver, and the storage module may be a memory. The memory may be integrated with the processor, or may be disposed separately from the processor. This is not limited in this application.

In another possible design, a structure of the communication apparatus includes a processor, and may further include a memory. The processor is coupled to the memory, and may be configured to execute computer program instructions stored in the memory, so that the communication apparatus performs the method in any one of the first aspect or the possible designs of the first aspect. Optionally, the communication apparatus further includes a communication interface, and the processor is coupled to the communication interface. When the communication apparatus is a terminal device, the communication interface may be a transceiver or an input/output interface. When the communication apparatus is a chip included in the terminal device, the communication interface may be an input/output interface of the chip. Optionally, the transceiver may be a transceiver circuit, and the input/output interface may be an input/output circuit.

According to a third aspect, an embodiment of this application provides a chip system, including a processor. The processor is coupled to a memory. The memory is configured to store a program or instructions. The chip system may further include an interface circuit. The interface circuit is configured to receive code instructions and transmit the code instructions to the processor. When the program or the instructions are executed by the processor, the chip system implements the method in any one of the first aspect or the possible designs of the first aspect.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a fourth aspect, an embodiment of this application provides a computer-readable storage medium, where the computer storage medium stores computer-readable instructions. When a computer reads and executes the computer-readable instructions, the computer is enabled to perform the method in any one of the first aspect or the possible designs of the first aspect or the method in any one of the second aspect, the fourth aspect, or the sixth aspect or the possible designs of the second aspect, the fourth aspect, or the sixth aspect.

According to a fifth aspect, an embodiment of this application provides a computer program product, and when a computer reads and executes the computer program product, the computer is enabled to perform the method according to any one of the first aspect or the possible designs of the first aspect.

According to a sixth aspect, an embodiment of this application provides a communication system. The communication system includes the first terminal device and the second terminal device described above. Optionally, the communication system may further include a network device.

DETAILED DESCRIPTION OF ILLUSTRATIVE EMBODIMENTS

To make objectives, technical solutions, and advantages of the embodiments of this application clearer, the following further describes the embodiments of this application in detail with reference to the accompanying drawings.

The technical solutions of the embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a 5th generation (5G) system or a new radio (NR) system, or is used in a future communication system, another similar communication system, or the like.

The technical solutions in the embodiments of this application may be used in technical fields such as unmanned driving, assisted driving (ADAS), intelligent driving, connected driving, intelligent network driving, car sharing, a smart/intelligent car, a digital car, an unmanned car (driverless car/pilotless car/automobile), the internet of vehicles (IoV), a self-driving car (autonomous car), a cooperative vehicle infrastructure (CVIS), an intelligent transportation system (ITS), and vehicular communication.

In addition, the technical solutions provided in the embodiments of this application may be applied to a cellular link, or may be applied to a link between devices, for example, a device to device (D2D) link. The D2D link or a V2X link may also be referred to as a sidelink, a secondary link, a sidelink, or the like. In the embodiments of this application, the foregoing terms all refer to links established between devices of a same type, and have a same meaning. The link established between devices of a same type may be a link between terminal devices, a link between base stations, a link between relay nodes, or the like. This is not limited in the embodiments of this application. For the link between the terminal devices, there is a D2D link defined in 3GPP Release (Rel)-12/13, and there is also a V2X link, defined by 3GPP for the internet of vehicles, from a vehicle to a vehicle, a vehicle to a mobile phone, or a vehicle to any entity. The V2X link includes a V2X link in Rel-14/15, and further includes, for example, an NR-system-based V2X link in Rel-16 and subsequent releases which are currently being researched by 3GPP.

Figure 1:
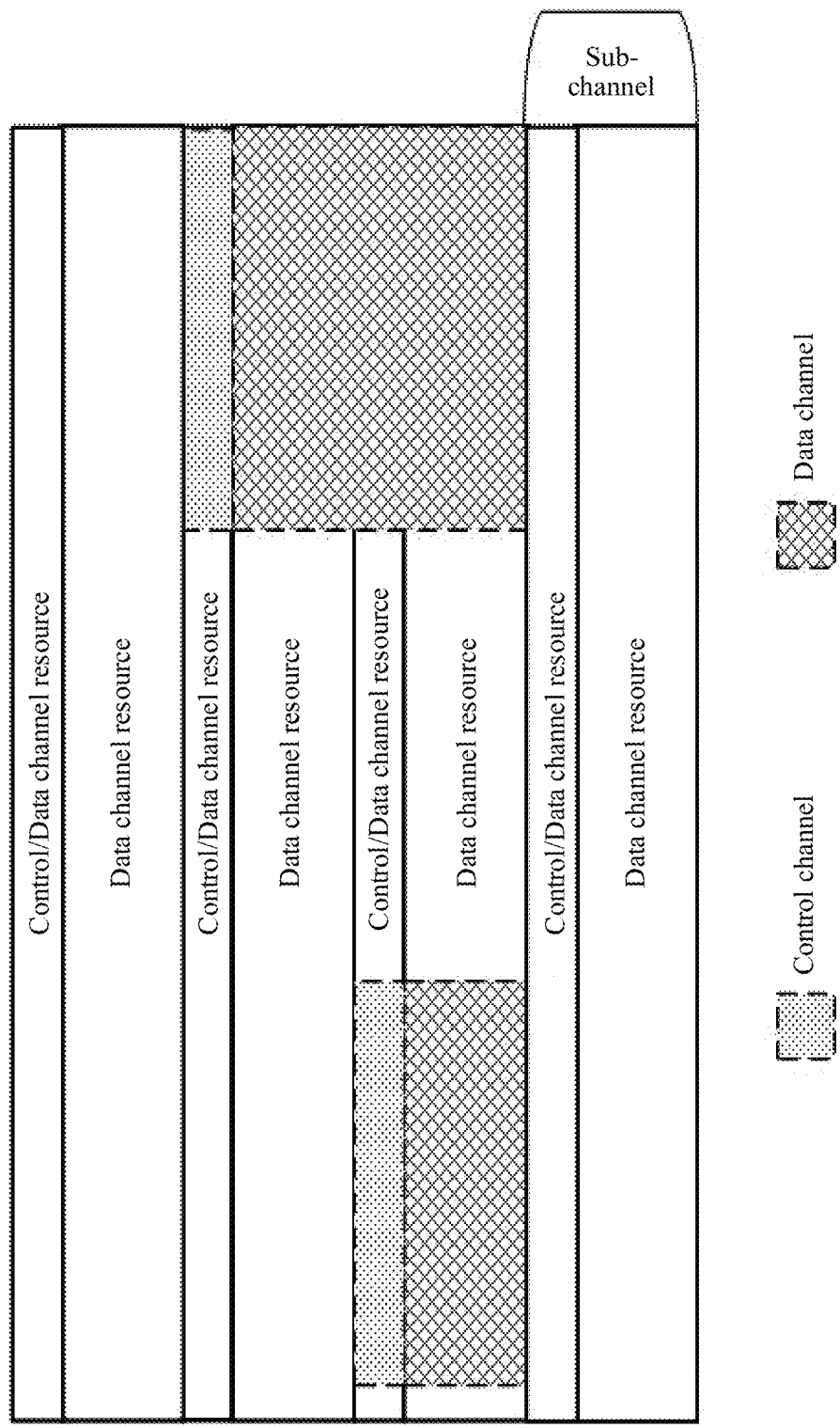
FIG. 1 is a schematic diagram of a resource mapping manner in an existing LTE V2X technology.
Figure 2:
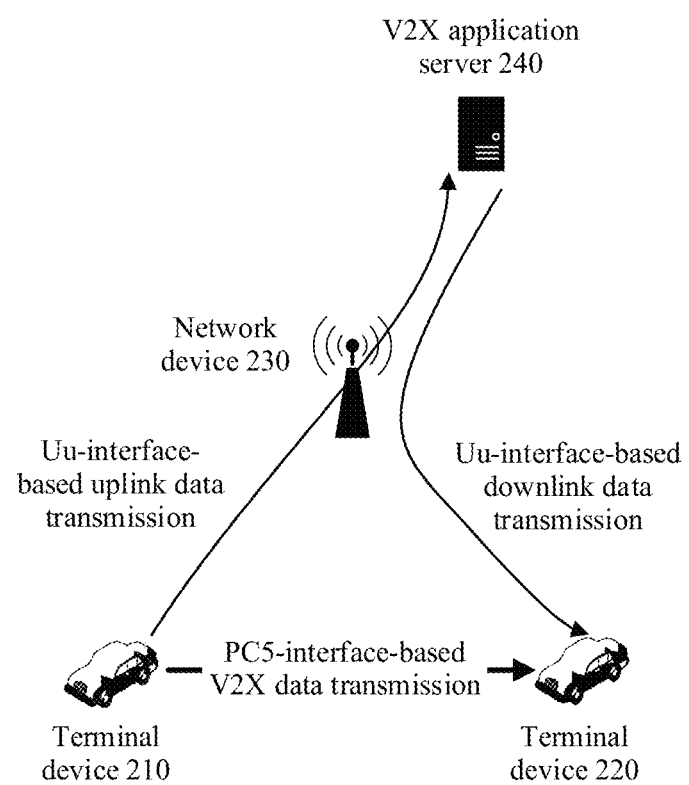
FIG. 2 is a schematic diagram of a network architecture to which an embodiment of this application is applicable.

FIG. 2 is a schematic diagram of a network architecture of a communication system to which an embodiment of this application is applicable. The communication system includes a terminal device 210 and a terminal device 220. Direct communication may be performed between terminal devices through a PC5 interface, and a direct communication link between the terminal devices is a sidelink. Sidelink-based communication may use at least one of the following channels: a physical sidelink shared channel (PSSCH), used to carry data; a physical sidelink control channel (PSCCH), used to carry sidelink control information (SCI).

Optionally, the communication system further includes a network device 230, configured to provide timing synchronization and resource scheduling for the terminal devices. The network device may communicate with at least one terminal device (for example, the terminal device 210) through a Uu interface. A communication link between the network device and the terminal device includes an uplink (UL) and a downlink (DL). Indirect communication may be further implemented between the terminal devices through forwarding performed by the network device. For example, the terminal device 210 may send data to the network device 230 through the Uu interface. After the network device 230 sends the data to an application server 240 for processing, the application server 240 delivers the processed data to the network device 230, and the network device 230 sends the processed data to the terminal device 220. In a Uu-interface-based communication mode, a network device 230 for forwarding uplink data from the terminal device 210 to the application server 240 and a network device 230 for forwarding downlink data delivered by the application server 240 to the terminal device 220 may be a same network device, or may be different network devices, and may be determined by the application server.

The network device in FIG. 2 may be an access network device, for example, a base station. The access network device corresponds to different devices in different systems. For example, in a 5G system, the access network device corresponds to an access network device in 5G, for example, a gNB. Although only the terminal device 210 and the terminal device 220 are shown in FIG. 2, it should be understood that the network device may provide services for a plurality of terminal devices, and the number of terminal devices in the communication system is not limited in this embodiment of this application. Similarly, the terminal devices in FIG. 2 are described by using in-vehicle terminal devices or vehicles as an example. It should also be understood that a terminal device in this embodiment of this application is not limited thereto, and the terminal device may alternatively be an in-vehicle module, a road side unit, or a pedestrian handheld device. It should be understood that this embodiment of this application is not limited to being applicable to a 4G or 5G system, and is further applicable to a subsequent evolved communication system.

The following describes some terms in the embodiments of this application, to facilitate understanding of a person skilled in the art.

(1) Terminal device: The terminal device may also be referred to as user equipment (UE), a mobile station (MS), a mobile terminal (MT), or the like, and is a device that provides voice and/or data connectivity for a user. The terminal device may communicate with a core network through a radio access network (RAN), and exchange a voice and/or data with the RAN. For example, the terminal device may be a handheld device, a vehicle-mounted device, vehicle user equipment, or the like that has a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home. The terminal device in the embodiments of this application may alternatively be a built-in in-vehicle module, in-vehicle module, in-vehicle component, in-vehicle chip, or in-vehicle unit with which a vehicle is equipped and that is used as one or more components or units. The vehicle may use the built-in in-vehicle module, in-vehicle module, in-vehicle component, in-vehicle chip, or in-vehicle unit to implement the method in this application.

(2) Network device: The network device is a device that is in a network and that is configured to connect a terminal device to a wireless network. The network device may be a node in a radio access network, and may also be referred to as a base station, or may be referred to as a radio access network (RAN) node (or device). The network device may be configured to: mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include a long term evolution (LTE) system or an evolved NodeB (NodeB, eNB, or e-NodeB) in an LTE-Advanced (LTE-A) system, for example, a conventional macro base station eNB and a micro base station eNB in a heterogeneous network scenario; or may include a next generation NodeB (gNB) in a 5th generation (5G) new radio (NR) system; or may further include a transmission reception point (TRP), a home base station (for example, a home evolved NodeB, or a home NodeB, HNB), a baseband unit (BBU), a baseband pool BBU pool, a Wi-Fi access point (AP), or the like; or may further include a centralized unit (CU) and a distributed unit (DU) in a cloud radio access network (CloudRAN) system. This is not limited in the embodiments of this application. For another example, a network device in a V2X technology is a road side unit (RSU). The RSU may be a fixed infrastructure entity supporting a V2X application, and may exchange a message with another entity supporting the V2X application.

(3) The terms "system" and "network" may be used interchangeably in the embodiments of this application. A plurality of means two or more. In view of this, "a plurality of" may also be understood as "at least two" in the embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects, unless otherwise specified.

Unless otherwise stated, ordinal numbers such as "first" and "second" in the embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

Figure 3:
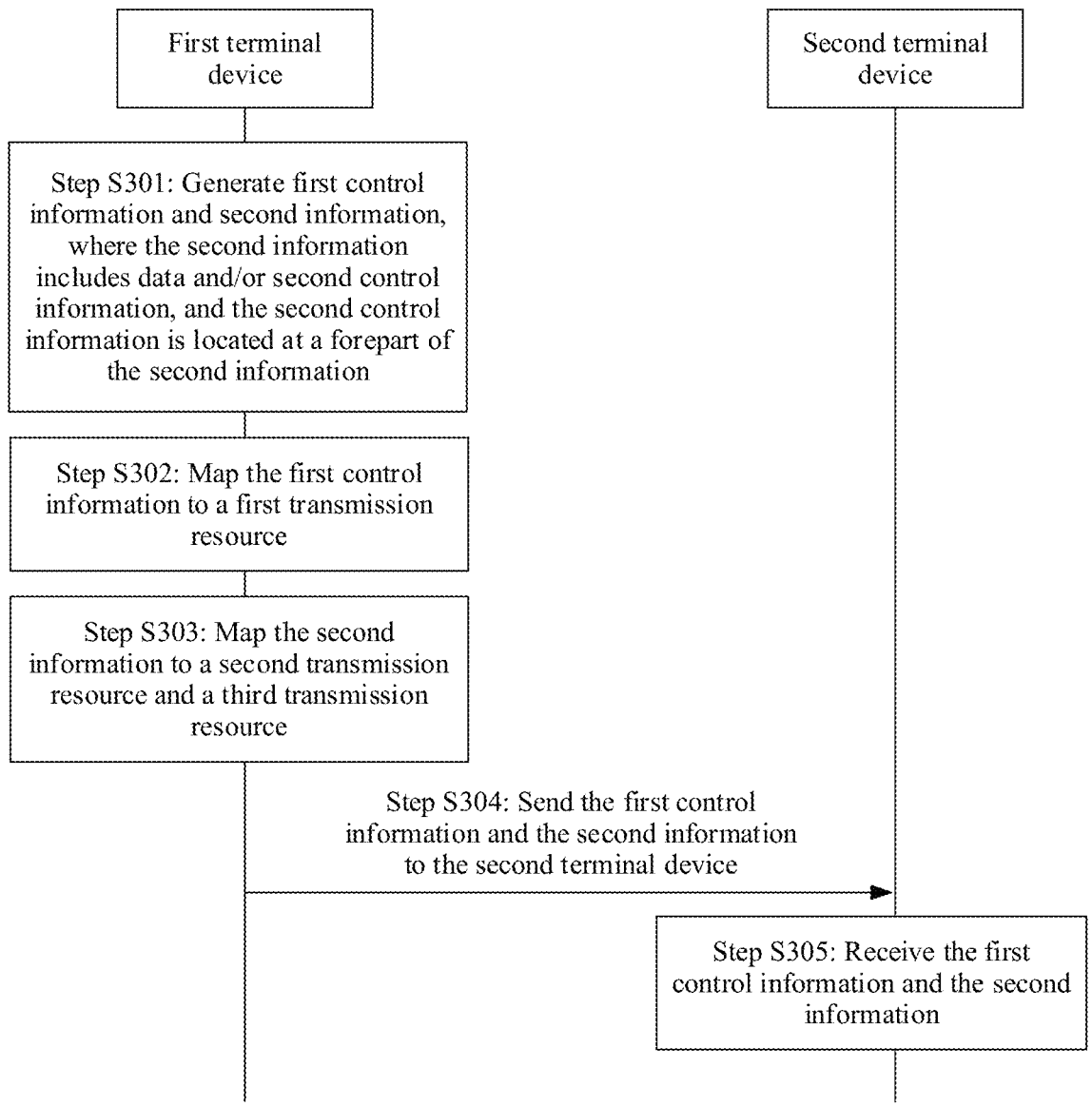
FIG. 3 is a schematic flowchart of a communication method according to an embodiment of this application.

FIG. 3 is a schematic flowchart of a communication method according to an embodiment of this application. The method includes step S301 to step S304.

Step S301: A first terminal device generates first control information and second information, where the second information includes data and/or second control information, and the second control information is located at a forepart of the second information.

In this embodiment of this application, there are two types of control information: the first control information and the second control information. Correspondingly, one scheduling unit has two stages of control channels, which are respectively used to carry the first control information and the second control information. The scheduling unit is a set of resources scheduled for one transmission of data. One scheduling unit may include one or more consecutive sub-channels in frequency domain, and one sub-channel may include several consecutive resource blocks (RBs) in frequency domain. One scheduling unit may include one time unit in time domain, and the time unit may be a time unit including a plurality of types of possible time granularities, such as a slot, a mini-slot, a subframe, and a frame. It should be understood that bandwidth of the scheduling unit is not specifically limited in this embodiment of this application. The number of sub-channels included in the scheduling unit and a size of each sub-channel may be configured or preconfigured by a network device.

The first control information is applicable to scenarios such as broadcast, unicast, and multicast, and may be basic control information required for V2X communication. For example, the first control information may include an $L_1$ layer destination user ID (destination identity), data channel frequency domain bandwidth, resource reservation information, a time interval between an initial transmission and a retransmission, and the like. The first control information is carried on a first-stage control channel, and the first-stage control channel may be, for example, a first-stage PSCCH channel.

The second control information is applicable to scenarios such as unicast and multicast, and may be additional link maintenance information required in the scenarios such as unicast and multicast, to improve link reliability. For example, the second control information may include a modulation and coding scheme (MCS) of a data channel, a hybrid automatic repeat request (HARQ) version number of the data channel, an indication for a new transmission or a retransmission, and the like. The second control information is carried on a second-stage control channel, and the second-stage control channel may be, for example, a second-stage PSCCH channel. It should be understood that, in the broadcast scenario, the first terminal device may send the first control information only to the second terminal device. In the unicast and multicast scenarios, the first terminal device needs to send the first control information and the second control information to the second terminal device.

The data may be specific service data sent by the first terminal device to the second terminal device in the scenarios such as broadcast, unicast, and multicast. The data is carried on a data channel in the scheduling unit, and the data channel may be, for example, a PSSCH channel. For example, if both the first terminal device and the second terminal device are vehicles, the first terminal device may send, to the second terminal device, some information of the first terminal device, such as a position, a speed, and an intention (including turning, merging, and reversing).

Figure 4:
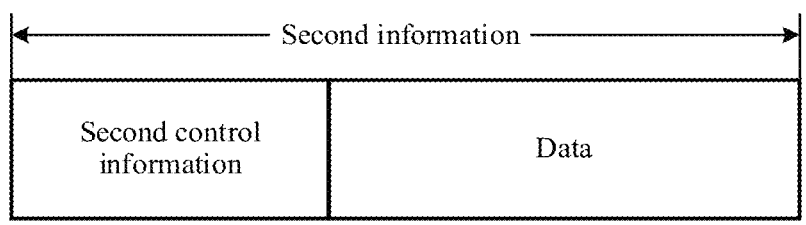
FIG. 4 is a schematic diagram of a structure of second information according to an embodiment of this application.

The second information may include the data and/or the second control information, and the second control information is located at a forepart of the second information. That is, the second information may include the data and the second control information, or may include only the data. If the second information includes the data and the second control information, that the second control information is located at the forepart of the second information means that the second control information is located before the data. FIG. 4 is an example of a schematic diagram of a structure of the second information according to this embodiment of this application. In FIG. 4, the second information includes both the data and the second control information, and the second control information is located before the data.

The second information may also be understood as an information bit stream obtained by the first terminal device by concatenating the second control information and the data. The second control information is concatenated before the data. In this way, in this embodiment of this application, that a first terminal device generates first control information and second information may include: The first terminal device separately generates the first control information, the second control information, and the data, and the first terminal device concatenates the second control information and the data to obtain the second information.

Figure 5:
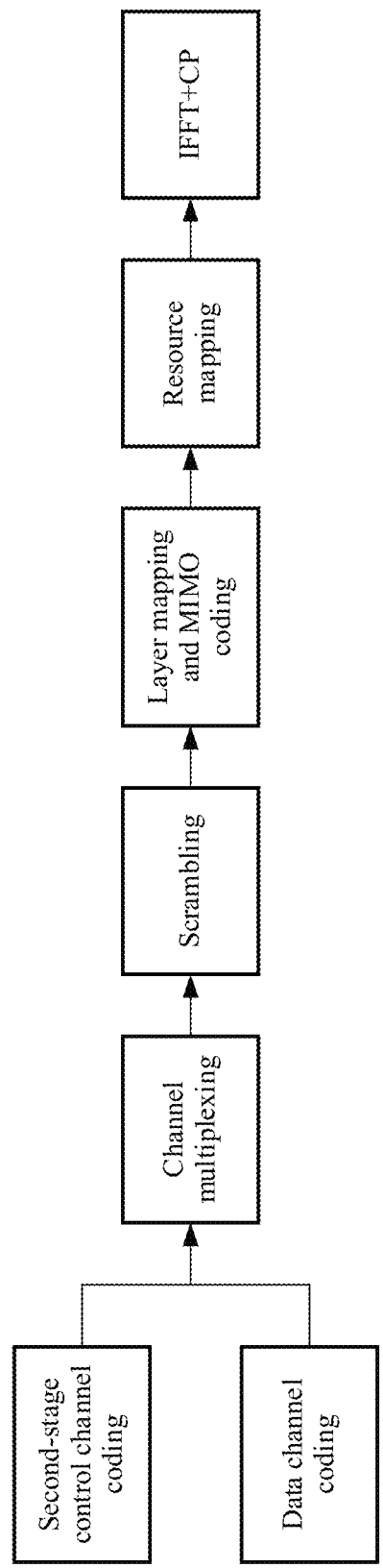
FIG. 5 is a schematic flowchart of processing second control information and data according to an embodiment of this application.

FIG. 5 is a schematic flowchart of processing the second control information and the data by the first terminal device according to an embodiment of this application. An entire processing procedure includes steps such as channel coding, channel multiplexing, scrambling, layer mapping, multiple-input multiple-output (MIMO) coding, resource mapping, inverse fast Fourier transform (IFFT), and a cyclic prefix (CP). Concatenating the second control information and the data by the first terminal device occurs in the channel multiplexing step shown in FIG. 5, and the channel multiplexing is multiplexing of the second-stage control channel and the data channel.

Specifically, in the channel coding step shown in FIG. 5, the first terminal device may separately perform channel coding on the second control information and the data, and an output of the channel coding is an output obtained through rate matching. A channel coding process may include processing processes such as cyclic redundancy check (CRC) addition for a transport block, code block segmentation, CRC addition for a code block, channel coding, and rate matching. Details are not described herein again.

In the channel multiplexing step, the first terminal device may perform channel multiplexing on an output obtained through channel coding performed on the second control information and an output obtained through channel coding performed on the data. The multiplexing of the second-stage control channel and the data channel may also be understood as concatenating the output obtained through channel coding performed on the second control information and the output obtained through channel coding performed on the data. The output obtained through channel coding performed on the second control information is concatenated before the output obtained through channel coding performed on the data.

If the output obtained through channel coding performed on the second control information is represented as $q_0, q_1, q_2, \ldots, q_{L_{2nd\text{-}SCI}-1}$, and the output obtained through channel coding performed on the data is represented as $f_0, f_1, f_2, \ldots, f_{M_{data}-1}$, an output obtained through concatenation of the output obtained through channel coding performed on the second control information and the output obtained through channel coding performed on the data may be represented as $g_0, g_1, g_2, \ldots, g_{G-1}$. $G=L_{2nd\text{-}SCI}+M_{data}$, where when $0 \leq i < L_{2nd\text{-}SCI}$, $g_i=q_i$, or when $L_{2nd\text{-}SCI} \leq i \leq G-1$, $g_i=f_{i-L_{2nd\text{-}SCI}}$. $L_{2nd\text{-}SCI}$ is the number of code blocks output through the channel coding performed on the second control information, and $M_{data}$ is the number of code blocks output through the channel coding performed on the data.

Step S302: The first terminal device maps the first control information to a first transmission resource, where the first transmission resource is a transmission resource occupied by the first-stage control channel in the scheduling unit.

Step S303: The first terminal device maps the second information to a second transmission resource and a third transmission resource, where the second information is preferentially mapped to the second transmission resource.

In this embodiment of this application, the first transmission resource, the second transmission resource, and the third transmission resource are located in the same scheduling unit. The second transmission resource and the first transmission resource do not overlap in time domain, and the third transmission resource and the first transmission resource overlap in time domain but do not overlap in frequency domain.

Figure 6A:
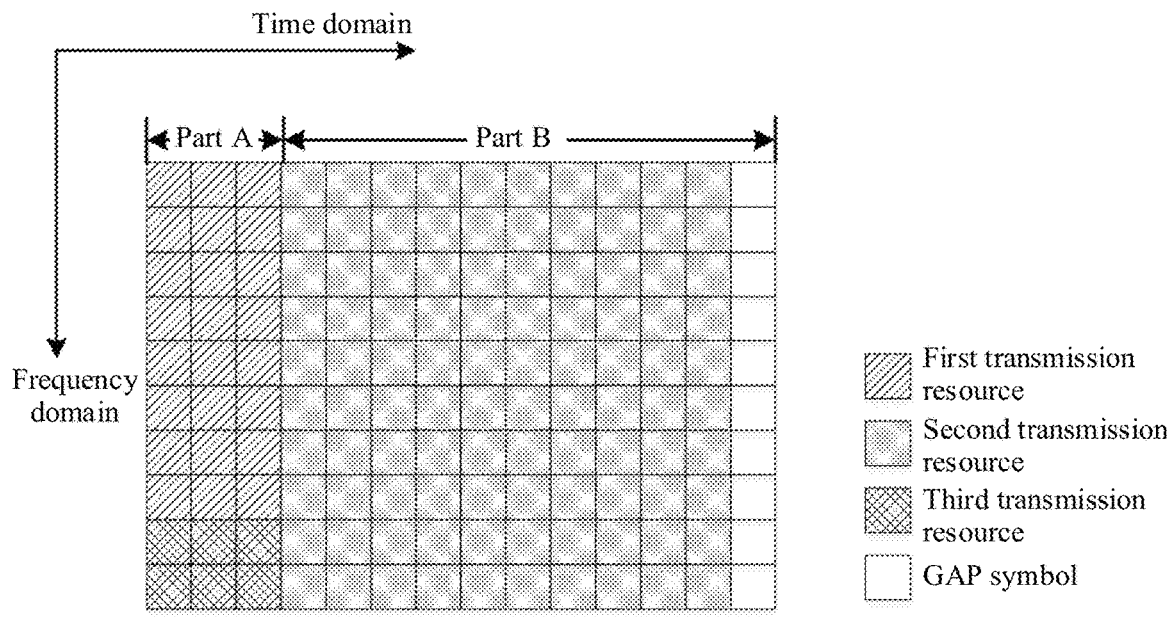
FIG. 6a to FIG. 6c are schematic diagrams of positions of a first transmission resource, a second transmission resource, a third transmission resource, and a fourth transmission resource according to an embodiment of this application.
Figure 6B:
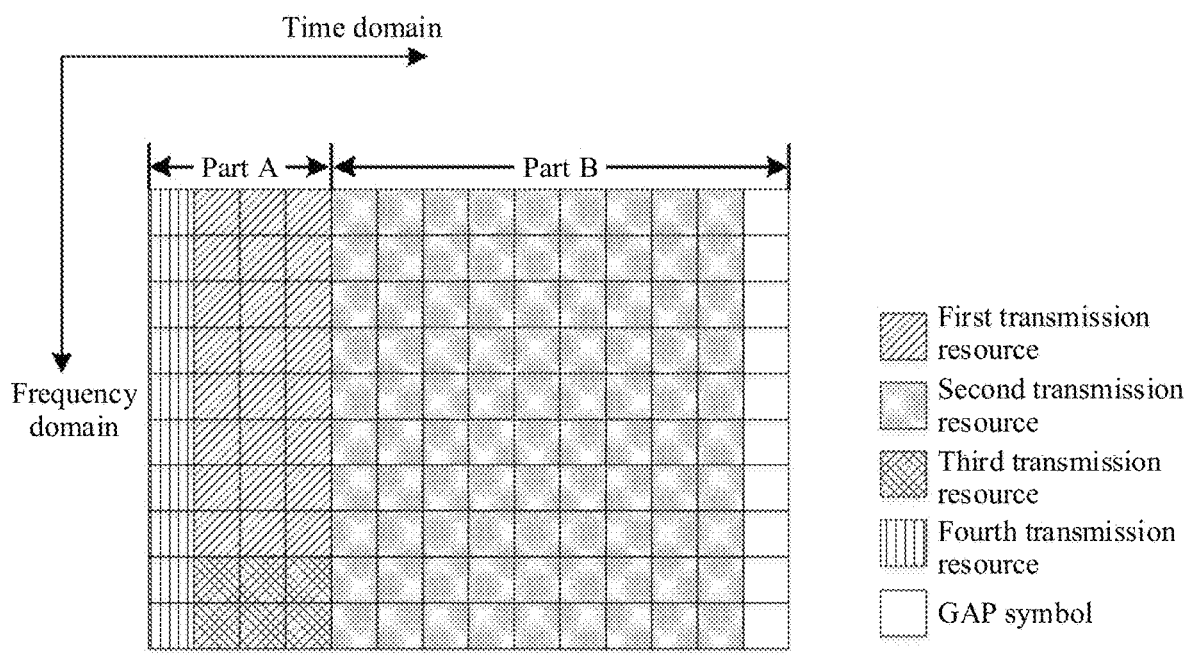
Figure 6C:
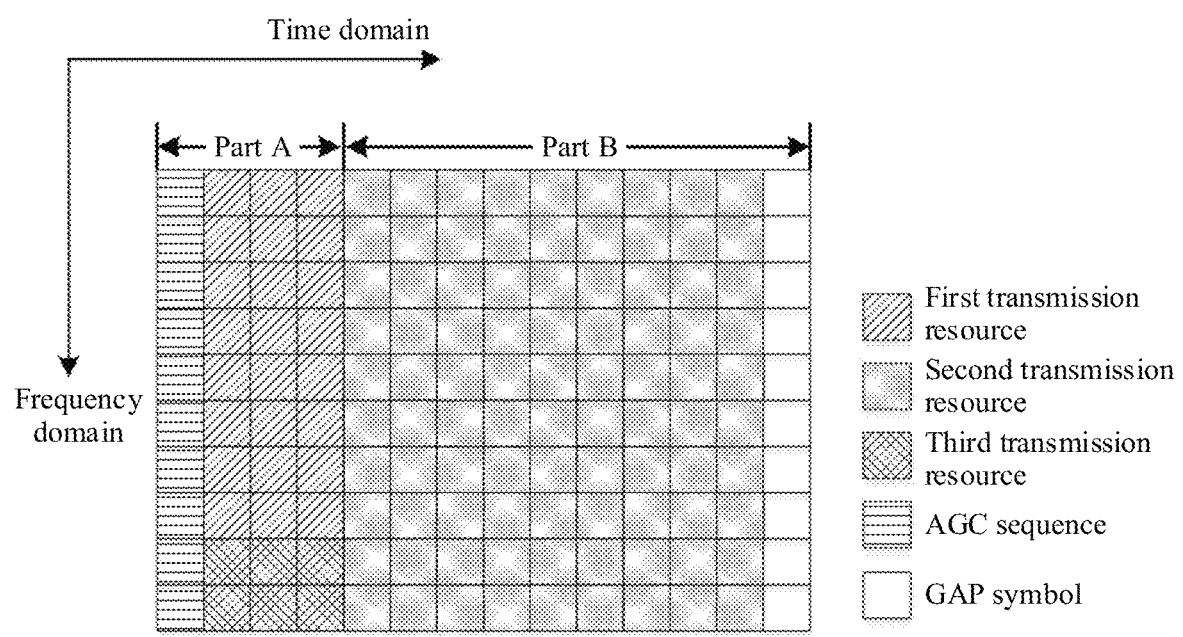

FIG. 6a to FIG. 6c are schematic diagrams of several possible positions of a first transmission resource, a second transmission resource, and a third transmission resource according to an embodiment of this application. In FIG. 6a to FIG. 6c, one scheduling unit includes one slot in time domain. The slot includes 14 symbols. The 14 symbols are sequentially numbered 0 to 13 from left to right. The scheduling unit includes 10 RBs in frequency domain. The 10 RBs are numbered 0 to 9 from top to bottom.

As shown in FIG. 6a to FIG. 6c, a time domain position (a time domain end position of the first transmission resource) of the last symbol included in the first transmission resource is used as demarcation, and then the scheduling unit may be divided into a part A and a part B in time domain.

In time domain, the first transmission resource may occupy some or all of time domain resources of the part A. In frequency domain, the first transmission resource occupies some frequency domain resources in the scheduling unit. Generally, a resource size of the first transmission resource is fixed, and may be represented by a rectangle including a plurality of resource blocks in one scheduling unit in the figure.

It should be understood that a frequency domain start resource block of the first transmission resource may be the same as or different from a frequency domain start resource block of the scheduling unit. This is not limited in this application. In other words, the first transmission resource may include the uppermost resource block numbered 0 in the scheduling unit, or may not include the uppermost resource block numbered 0 in the scheduling unit. Alternatively, it may be understood that the first transmission resource may be aligned or not aligned with a frequency domain start position of the scheduling unit.

It should be further understood that the first transmission resource may include a resource on a $1^{st}$ symbol in the scheduling unit, or may not include a resource on a $1^{st}$ symbol in the scheduling unit. For example, as shown in FIG. 6a, if impact of automatic gain control (AGC) on a control channel is not considered, the first transmission resource may include the resource on the $1^{st}$ symbol in the scheduling unit, that is, the first control information may be mapped to the resource on the $1^{st}$ symbol in the scheduling unit. Alternatively, it may be understood as that on the first-stage control channel, mapping may start from the $1^{st}$ symbol in the scheduling unit.

For another example, as shown in FIG. 6b, if impact of AGC on a control channel is considered, the first transmission resource may not include the resource on the $1^{st}$ symbol in the scheduling unit. The first control information may be mapped from a $2^{nd}$ symbol in the scheduling unit by avoiding the $1^{st}$ symbol in the scheduling unit. Alternatively, it may be understood as that on the first-stage control channel, the $1^{st}$ symbol in the scheduling unit is avoided, and mapping starts from the $2^{nd}$ symbol in the scheduling unit.

For another example, as shown in FIG. 6c, an AGC sequence exists in the scheduling unit, and the AGC sequence is mapped to all resource blocks on the $1^{st}$ symbol in the scheduling unit. In this case, the first transmission resource may alternatively not include the resource on the $1^{st}$ symbol in the scheduling unit. The first control information may be mapped from a $2^{nd}$ symbol in the scheduling unit by avoiding the $1^{st}$ symbol in the scheduling unit. Alternatively, it may be understood as that on the first-stage control channel, the $1^{st}$ symbol in the scheduling unit is avoided, and mapping starts from the $2^{nd}$ symbol in the scheduling unit.

In this embodiment of this application, the second transmission resource and the first transmission resource do not overlap in time domain, but at least partially overlap in frequency domain. For example, in time domain, the second transmission resource may occupy some time domain resources in the part B in the scheduling unit, and in frequency domain, the second transmission resource may occupy all frequency domain resources in the scheduling unit. Because the last symbol in a scheduling unit is usually a GAP symbol, the second transmission resource usually does not include a resource of the last symbol in the scheduling unit.

In a possible design, as shown in FIG. 6a to FIG. 6c, the second transmission resource may be immediately adjacent to the first transmission resource in time domain. In other words, if the first transmission resource occupies an $n^{th}$ symbol to an $(n+k)^{th}$ symbol in the scheduling unit, a $1^{st}$ symbol (a time domain start symbol) included in the second transmission resource is an $(n+k+1)^{th}$ symbol in the scheduling unit. Herein, n is 0 or 1, and k is a positive integer. In this way, indication information of a start position of the second transmission resource can be reduced, and resource overheads can be reduced. It may be understood that, when n is 0, it indicates that the first transmission resource includes the resource on the $1^{st}$ symbol in the scheduling unit, mapping of the first control information starts from the $1^{st}$ symbol in the scheduling unit; or when n is 1, it indicates that the first transmission resource does not include the resource on the $1^{st}$ symbol in the scheduling unit, and mapping of the first control information starts from the $2^{nd}$ symbol in the scheduling unit.

Still further, the second transmission resource may occupy all resources except a GAP symbol in the part B in the scheduling unit. That is, the last symbol (a time domain end symbol) included in the second transmission resource may be a penultimate symbol in the scheduling unit, and the last symbol in the scheduling unit is a GAP symbol.

In this embodiment of this application, the third transmission resource and the first transmission resource overlap in time domain but do not overlap in frequency domain. The third transmission resource may be understood as a resource other than the first transmission resource in a time domain range in which the first transmission resource is located.

The following describes in detail a process in which the first terminal device maps the first control information to the first transmission resource, and maps the second information to the second transmission resource and the third transmission resource.

As shown in FIG. 5, the resource mapping is a step after the layer mapping and the MIMO coding. Before mapping the first control information to the first transmission resource, the first terminal device may further perform independent processing processes on the first control information, for example, the channel coding, the scrambling, the layer mapping, and the MIMO coding. It should be noted that, different from FIG. 5, before the resource mapping is performed on the first control information, the channel multiplexing step is not included.

Before mapping the second information to the second transmission resource and the third transmission resource, the first terminal device may further separately perform channel coding on the second control information and the data, and then concatenate an output obtained through the channel coding performed on the second control information and an output obtained through the channel coding performed on the data, to obtain the second information. Then, the layer mapping, the MIMO coding, and the resource mapping are together performed on the second information.

In this embodiment of this application, the first terminal device may perform resource mapping first in frequency domain and then in time domain and in ascending order of numbers of resources. The first control information is used as an example. Mapping starts from a $1^{st}$ symbol included in the first transmission resource. The first control information is sequentially mapped to resource blocks on the symbol in ascending order of resource block numbers, until the first control information is mapped to all the resource blocks on the symbol. Then, mapping to a next symbol is performed. On the next symbol, the first control information is also sequentially mapped to resource blocks on the symbol in ascending order of resource block numbers, until the first control information is mapped to all the resource blocks on the symbol. By analogy, the first control information is mapped to all symbols included in the first transmission resource.

Figure 8:
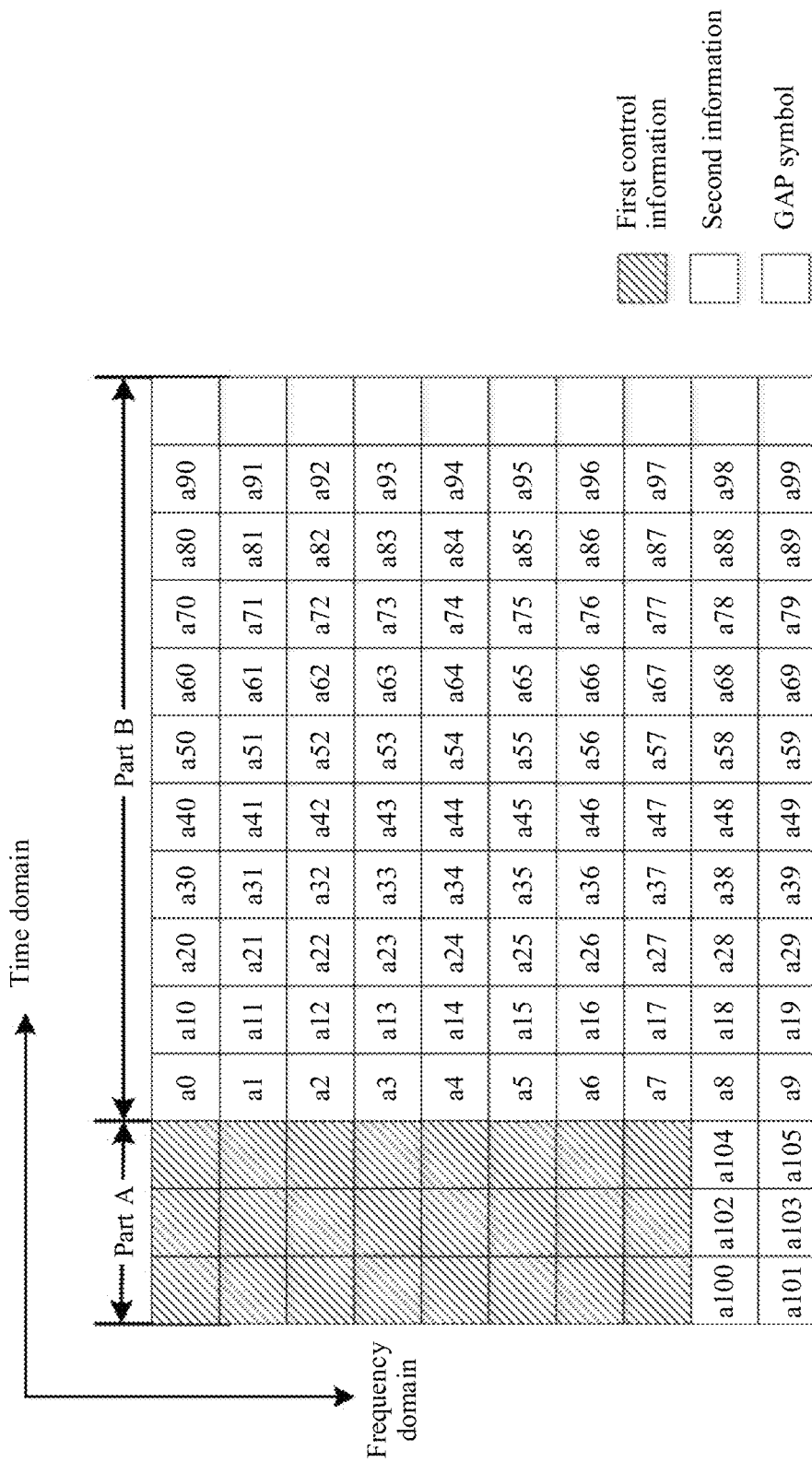
FIG. 8 is a schematic diagram of a mapping sequence of second information according to an embodiment of this application.
Figure 9:
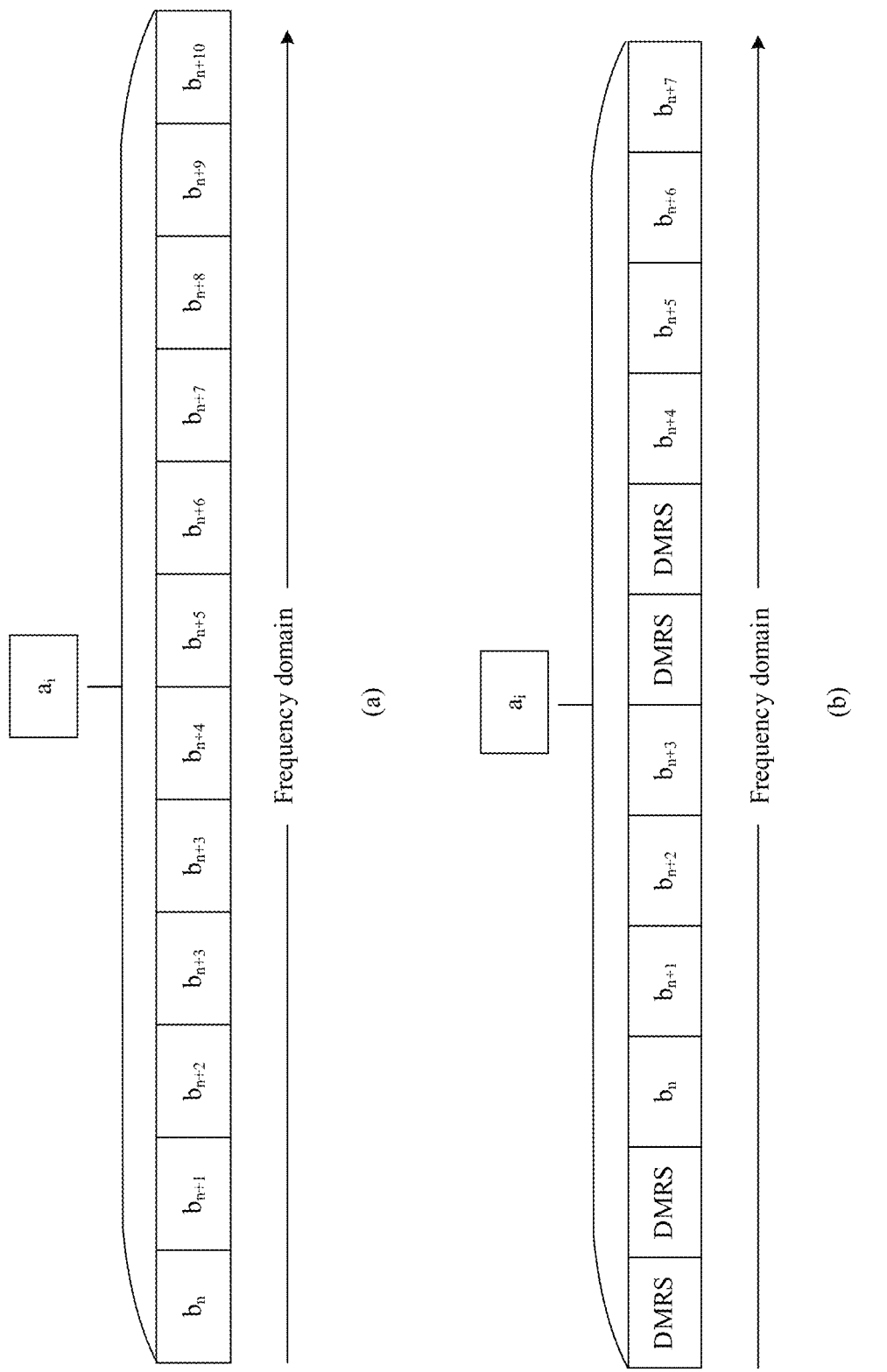
FIG. 9 is a schematic diagram of a mapping manner of second information according to an embodiment of this application.

It should be noted that, when performing resource mapping on the second information, the first terminal device preferentially maps the second information to the second transmission resource. That is, the first terminal device may first map the second information to the second transmission resource, and then map the second information to the third transmission resource after the mapping to the second transmission resource is completed. The manner of ascending order mapping first in frequency domain and then in time domain is also used. $a_0, a_1, a_2 \ldots, a_{N-1}$ is used to represent a complex data group that is output through modulation and coding of the second information, N represents the total number of RB resources occupied by the second information, and each data group is sequentially mapped to the second transmission resource and the third transmission resource in a manner of first frequency domain and then time domain. A frame structure, the second transmission resource, and the third transmission resource are shown in FIG. 6a, and a resource mapping sequence of the second information is shown in FIG. 8. In each RB, a complex data group that is output through modulation and coding of the second information is mapped to RE resources other than a DMRS. Therefore, an amount of modulated complex data included in each data group varies according to whether the DMRS is mapped. If an output obtained through modulation and coding of the second information is represented by using $b_1$, resource mapping on each RB is shown in FIG. 9. If there is no DMRS mapping in a current RB, an amount and a mapping manner of complex data that is of the second information and that is included in $a_t$ are shown in (a) of FIG. 9. If there is DMRS mapping in a current RB, an amount and a mapping manner of complex data that is of the second information and that is included in $a_t$ are shown in (b) of FIG. 9. n represents a start index of complex data in the current RB.

If the first transmission resource does not include the $1^{st}$ symbol in the scheduling unit, and there is no AGC sequence on the $1^{st}$ symbol in the scheduling unit, as shown in FIG. 6b, the first terminal device may further map the second information to a fourth transmission resource. The fourth transmission resource is a resource on the $1^{st}$ symbol in the scheduling unit, and the fourth transmission resource is located before the first transmission resource. Because the third transmission resource overlaps the first transmission resource in time domain, and is a resource multiplexed with the first transmission resource in a frequency division manner, the fourth transmission resource is also located before the third transmission resource.

In this case, when performing resource mapping on the second information, the first terminal device may sequentially map the second information to the second transmission resource, the fourth transmission resource, and the third transmission resource. That is, the first terminal device first maps the second information to the second transmission resource, then to the fourth transmission resource, and finally to the third transmission resource.

Figure 7A:
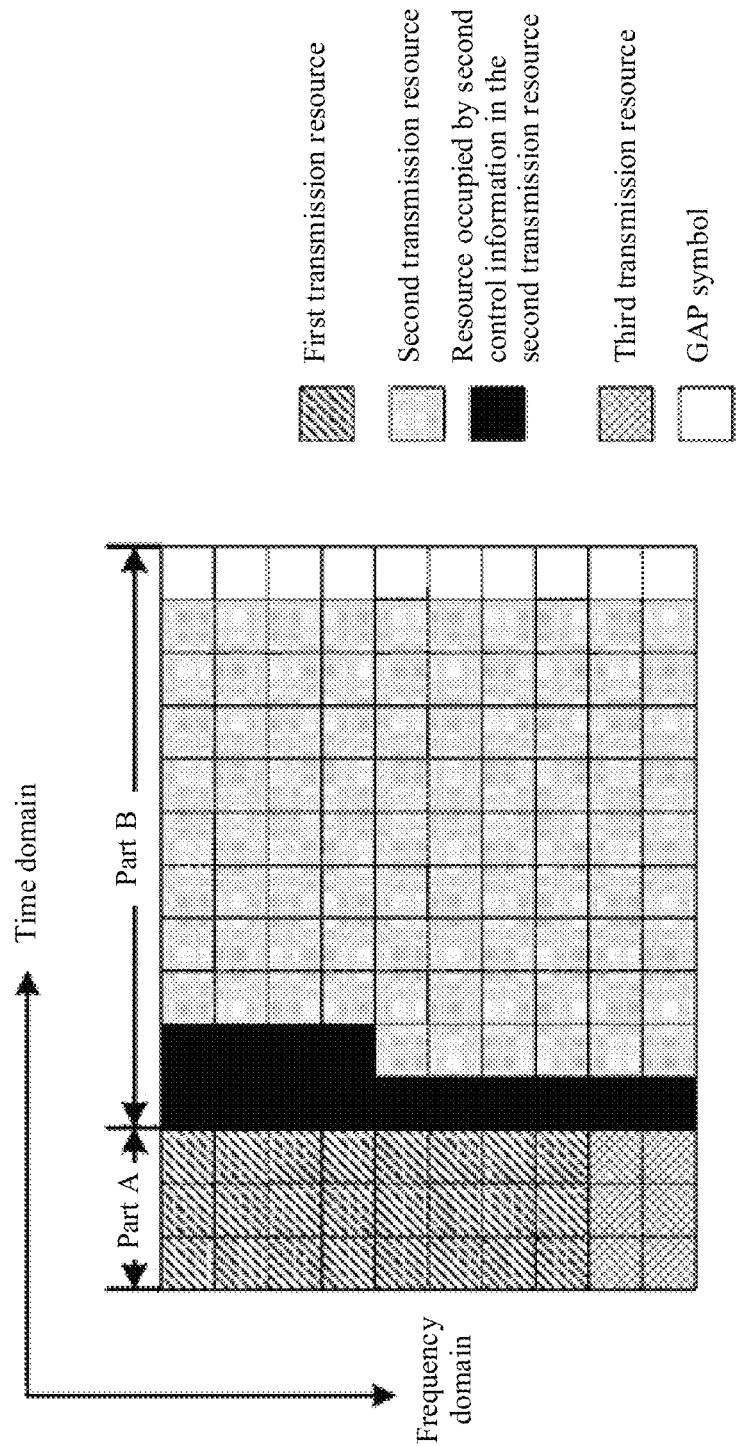
FIG. 7a to FIG. 7c are schematic diagrams of transmission resources occupied by second control information according to an embodiment of this application.
Figure 7B:
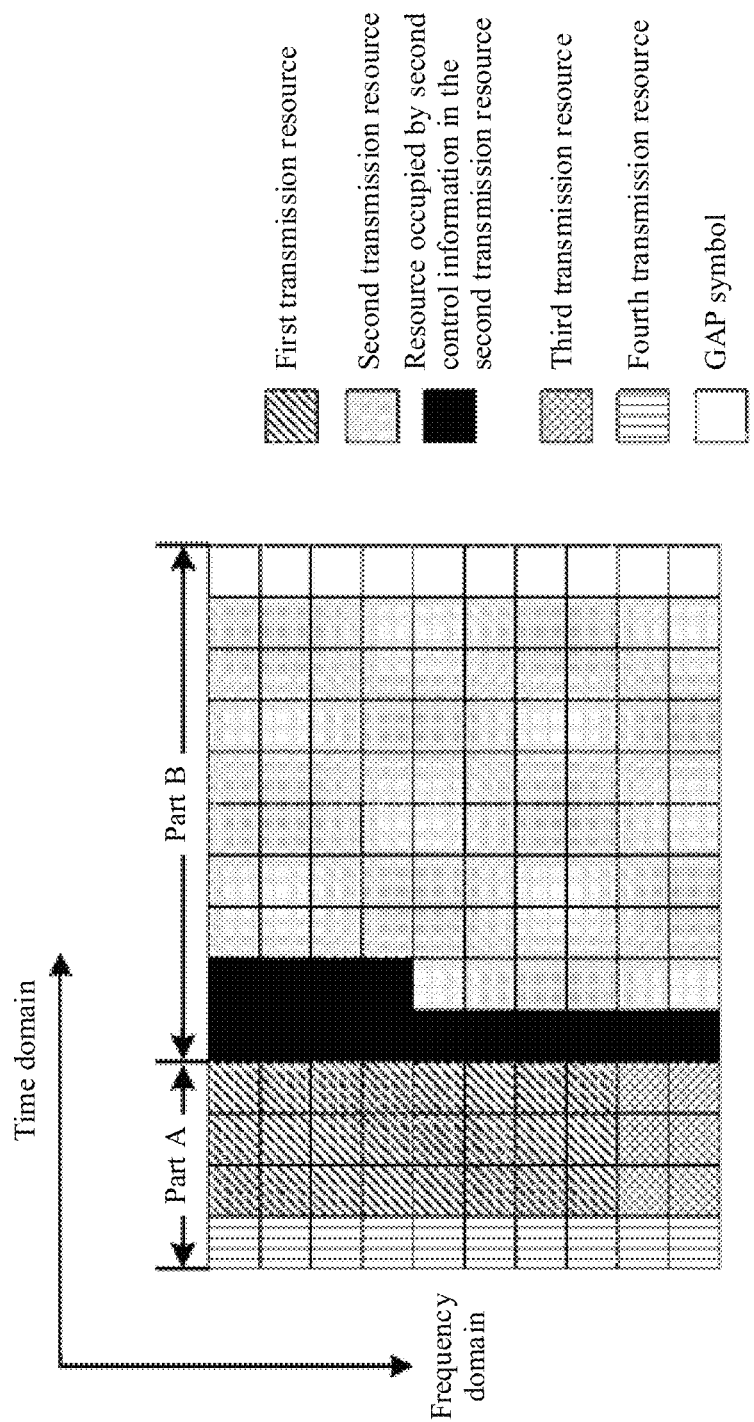
Figure 7C:
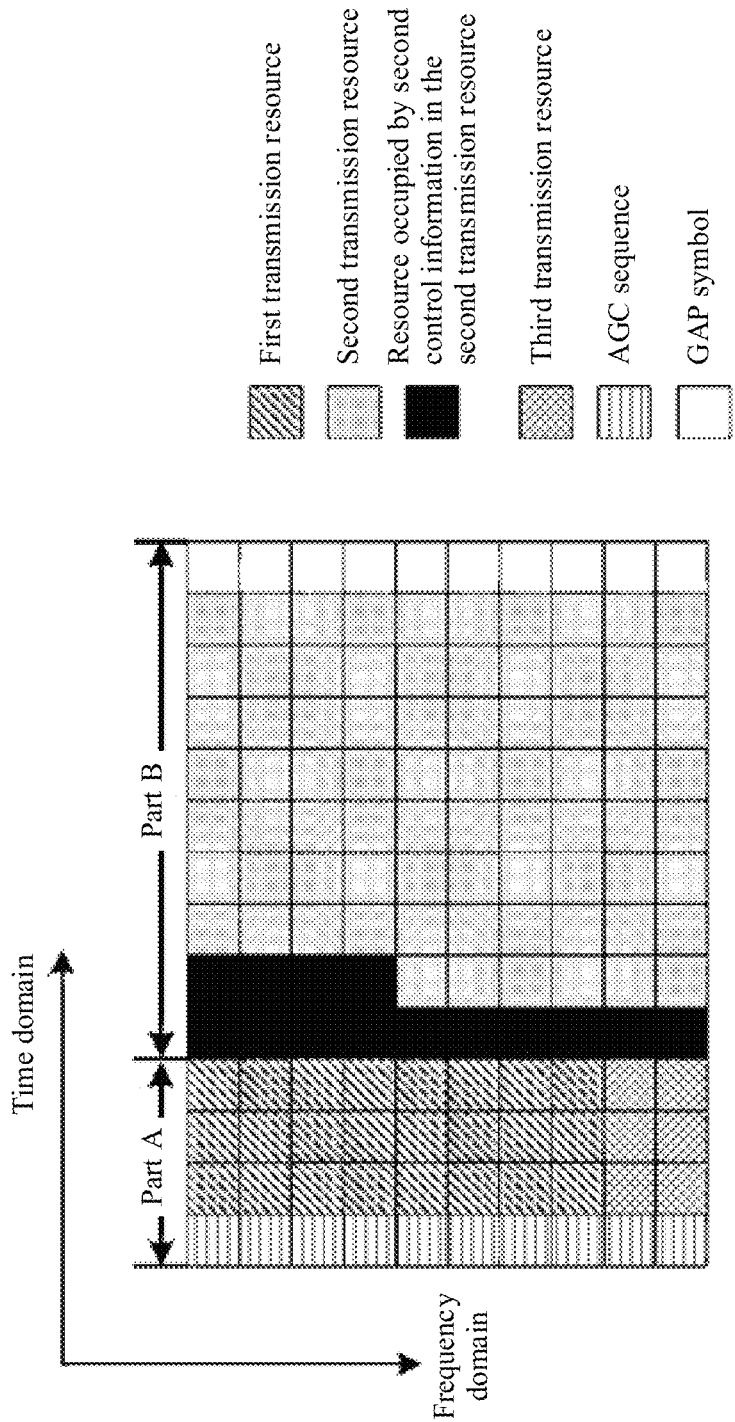
Figure 10A:
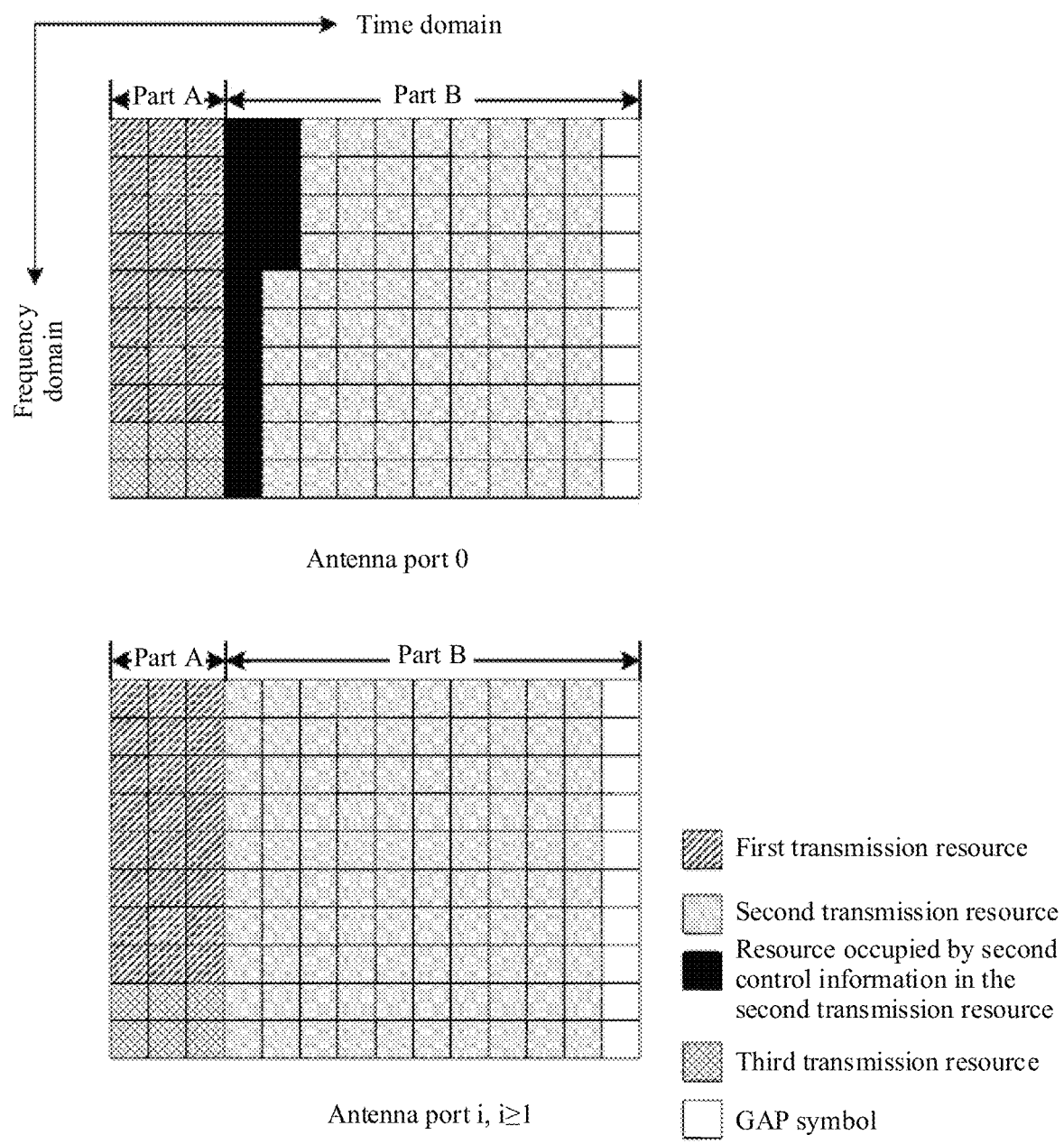
FIG. 10a to FIG. 10c are schematic diagrams of transmission resources occupied by second control information according to an embodiment of this application.
Figure 10B:
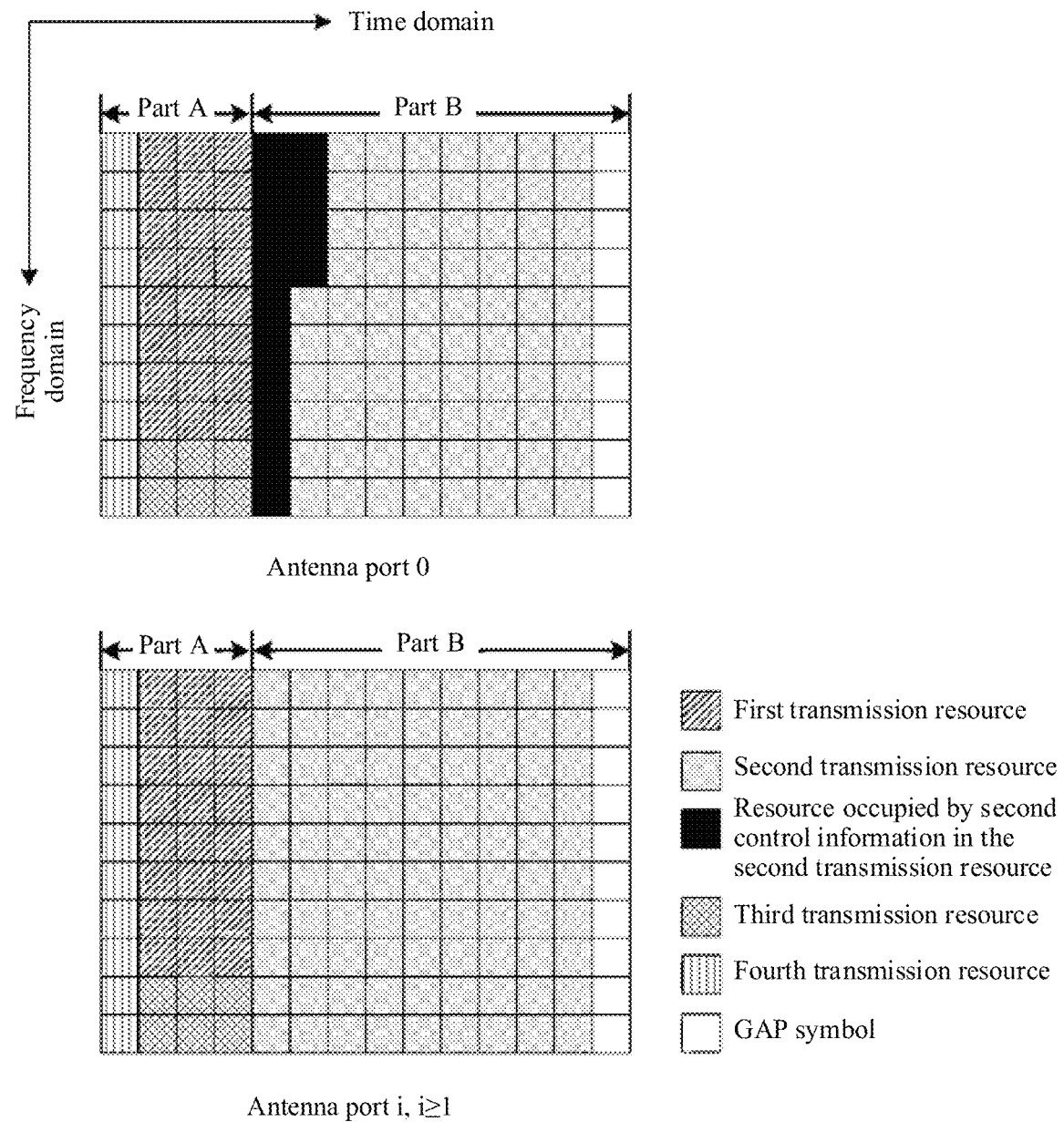
Figure 10C:
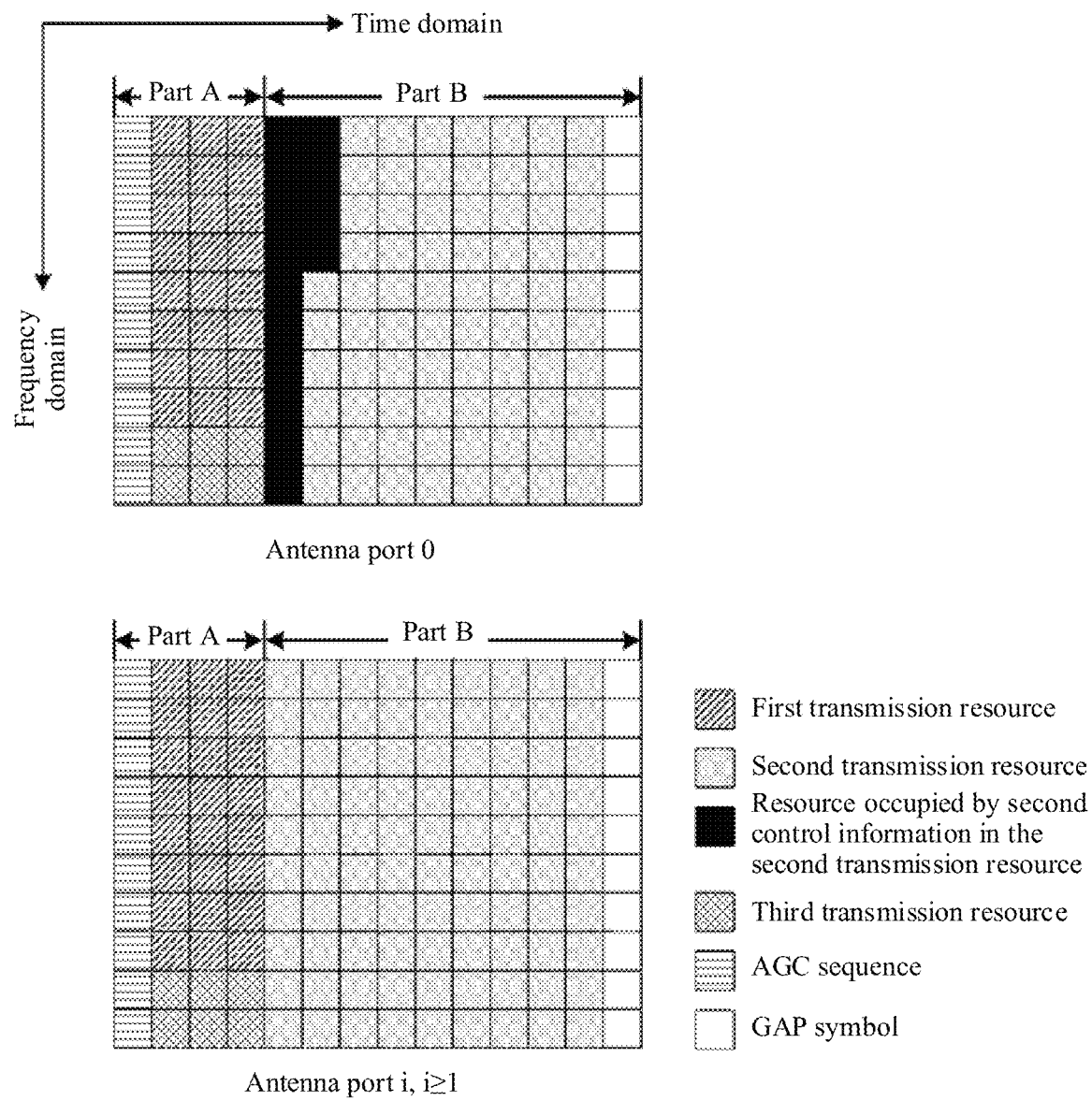

The second control information is located at a forepart of the second information, and the second control information is concatenated before the data inside the second information. Therefore, if the second transmission resources shown in FIG. 6a and FIG. 6b are used, and if transmission of the data is performed by using a single antenna port, resources actually occupied by the second control information in the second transmission resources may be respectively shown in FIG. 7a to FIG. 7c. FIG. 6a corresponds to FIG. 7a, FIG. 6b corresponds to FIG. 7b, and FIG. 6c corresponds to FIG. 7c. If transmission of the data is performed by using a plurality of antenna ports (more than one antenna port), actual resource mapping manners of the second control information in the second transmission resources may be respectively shown in FIG. 10a to FIG. 10c. FIG. 6a corresponds to FIG. boa, FIG. 6b corresponds to FIG. bob, and FIG. 6c corresponds to FIG. 10c.

Step S304: The first terminal device sends the first control information and the second information to a second terminal device.

Step S305: The second terminal device receives the first control information and the second information that are sent by the first terminal device.

In this embodiment of this application, a length of the first control information may be fixed, and a length of the second control information is variable. To help the second terminal device receive the second control information, the first control information may further include information used to indicate a size of a transmission resource occupied by the second control information. For example, the information used to indicate the size of the transmission resource occupied by the second control information may be an aggregation level of the second-stage control channel.

One resource mapping manner is used in the technical solutions provided in this application, and there may be another resource mapping manner in the art. This is not limited in this application. Before performing data transmission, the first terminal device may select a proper resource mapping manner based on a service type or a scheduled resource, and then perform data transmission. For example, different resource mapping manners may be used based on different resource pools in which the scheduling unit is located. To be specific, a resource mapping manner used by the first terminal device may be related to a resource pool in which the scheduling unit is located, and the different resource pools may be associated with the different resource mapping manners in advance. For another example, a used resource mapping manner may alternatively be configured by the network device, and sent to the first terminal device by using radio resource control (RRC) signaling. If the first terminal device selects the resource mapping manner provided in this application, the first terminal device may send the first control information, the second control information, and the data to the second terminal device by performing step S301 to step S305.

Therefore, the first control information may further include information used to indicate the resource mapping manner, and the information used to indicate the resource mapping manner may be an index of the resource mapping manner used by the first terminal device in a plurality of optional resource mapping manners. In a possible design, the first control information may include both the information used to indicate the size of the transmission resource occupied by the second control information and the information used to indicate the resource mapping manner.

Figure 11:
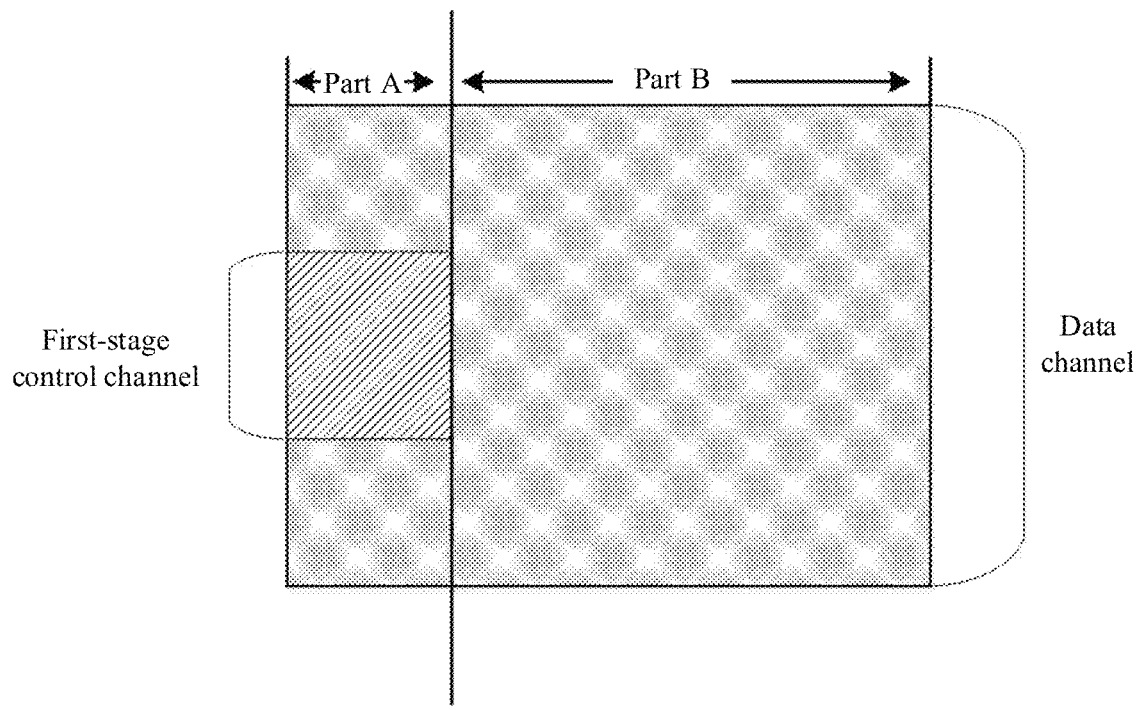
FIG. 11 is a schematic diagram of a frame structure according to an embodiment of this application.

FIG. 11 shows a frame structure used in an embodiment of this application. FIG. 11 shows only a first-stage control channel and a data channel. In this embodiment of this application, after second control information and data are concatenated, resource mapping is performed together. Therefore, it may also be understood as that the second control information and the data are multiplexed onto a data channel, and a second-stage control channel is considered as a part of the data channel.

In a part A shown in FIG. 11, the first-stage control channel and the data channel are mapped to all symbols of the part A in a frequency division multiplexing manner. In a part B shown in FIG. 11, only the data channel exists, and no first-stage control channel exists. Considering that when data transmission is performed by using a sidelink at present, it is required that total transmit power be the same on all symbols in a sending slot, in the part A shown in FIG. 11, because the first-stage control channel and the data channel exist at the same time, if power enhancement is performed on the first-stage control channel, average transmit power of the data channel on each resource block on each symbol in the part A is lower than transmit power of the data channel on each resource block on each symbol in the part B. Therefore, in the resource mapping manner provided in the embodiments of this application, the second control information and the data are concatenated, and then together mapped to the data channel of the part B, so that higher transmit power can be obtained for the second control information, so as to enhance reliability. In addition, the second control information in this embodiment of this application may be sent at different bit rates, and may be decoded by using a demodulation reference signal (DMRS) of the data channel, so that overheads of the control channel can be effectively reduced.

Figure 12:
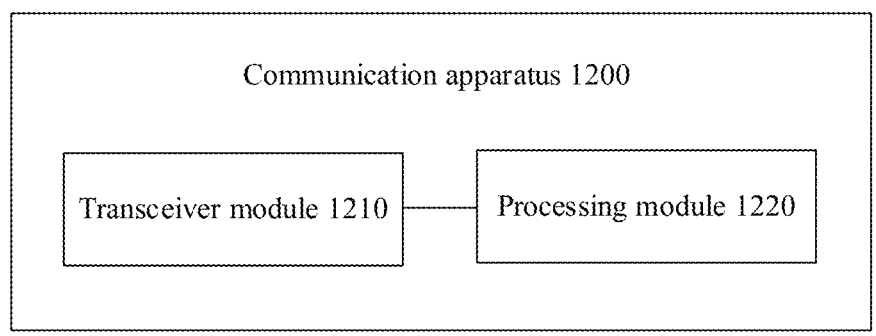
FIG. 12 is a schematic diagram of a structure of a communication apparatus according to an embodiment of this application.

An embodiment of this application provides a communication apparatus. FIG. 12 is a schematic diagram of a structure of a communication apparatus according to an embodiment of this application. The communication apparatus 1200 includes a transceiver module 1210 and a processing module 1220. The communication apparatus may be configured to implement a function of the first terminal device in any method embodiment described above. For example, the communication apparatus may be a handheld terminal device, an in-vehicle terminal device, or vehicle user equipment, or may be a chip included in a terminal device, or the communication apparatus is a vehicle-mounted apparatus, for example, a built-in in-vehicle module or in-vehicle unit with which a vehicle is equipped.

When the communication apparatus is used as the first terminal device to perform the method embodiment shown in FIG. 3, the processing module 1220 is configured to generate first control information and second information, where the second information includes data and/or second control information, and the second control information is located at a forepart of the second information; the processing module 1220 is further configured to: map the first control information to a first transmission resource, and map the second information to a second transmission resource and a third transmission resource, where the second information is preferentially mapped to the second transmission resource, the first transmission resource, the second transmission resource, and the third transmission resource are located in a same scheduling unit, the second transmission resource and the first transmission resource do not overlap in time domain, and the third transmission resource and the first transmission resource overlap in time domain but do not overlap in frequency domain; and the transceiver module 1210 is configured to send the first control information and the second information to a second terminal device.

In a possible design, the processing module 1220 is specifically configured to: generate the first control information, the second control information, and the data; and concatenate the second control information and the data to form the second information.

In a possible design, the processing module 1220 is further specifically configured to: perform layer mapping, multiple-input multiple-output MIMO coding, and resource mapping on the second information together, and map the second information to the second transmission resource and the third transmission resource.

In a possible design, the processing module 1220 is further specifically configured to map the second information to the second transmission resource and the third transmission resource first in frequency domain and then in time domain and in ascending order of sequence numbers of resource blocks and sequence numbers of symbols.

In a possible design, the processing module 1220 is further configured to map the second information to a fourth transmission resource, where the fourth transmission resource is a transmission resource on a $1^{st}$ symbol in the scheduling unit and is located before the first transmission resource.

In a possible design, the first transmission resource occupies an $n^{th}$ symbol to an $(n+k)^{th}$ symbol in the scheduling unit, a time domain start symbol of the second transmission resource is an $(n+k+1)^{th}$ symbol in the scheduling unit, n is 0 or 1, and k is a positive integer.

In a possible design, the first control information includes the information used to indicate a size of a transmission resource occupied by the second control information.

The processing module 1220 in the communication apparatus may be implemented by using a processor or a processor-related circuit component, and may be a processor or a processing unit. The transceiver module 1210 may be implemented by using a transceiver or a transceiver-related circuit component, and may be a transceiver or a transceiver unit. An operation and/or a function of each module in the communication apparatus is used to implement a corresponding procedure of the method shown in FIG. 3. For brevity, details are not described herein again.

Figure 13:
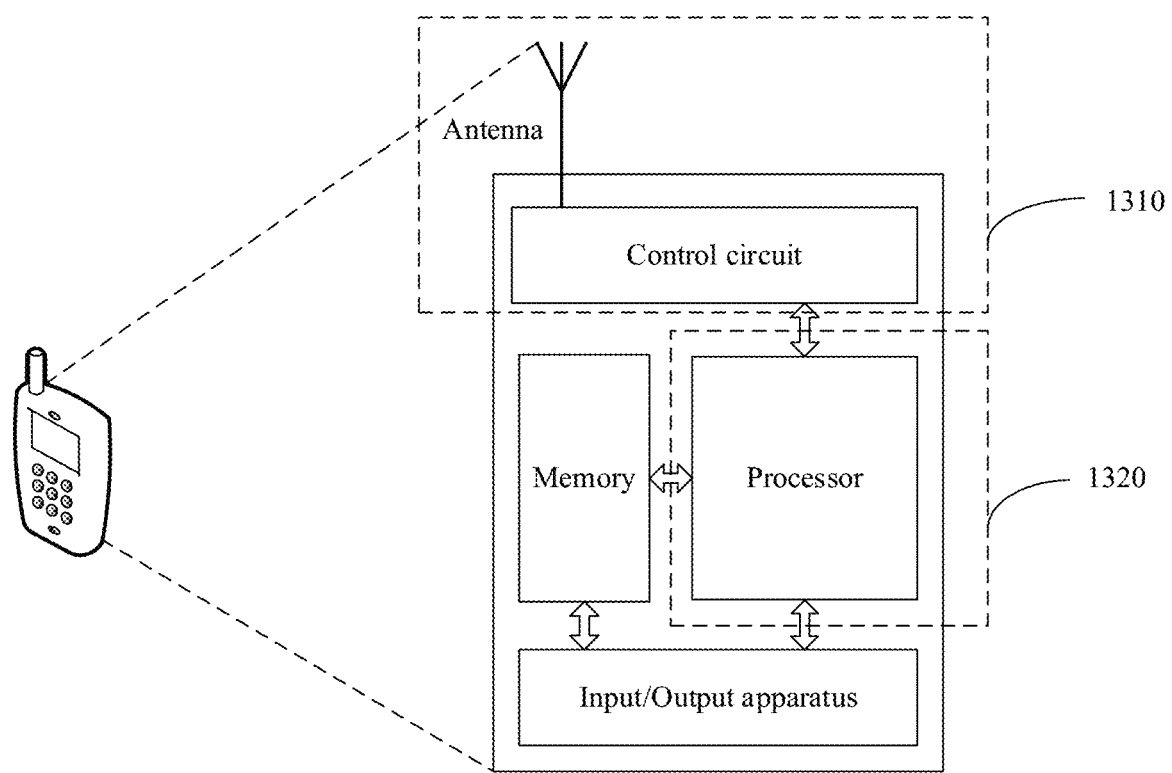
FIG. 13 is a schematic diagram of another structure of a communication apparatus according to an embodiment of this application.

FIG. 13 is a schematic diagram of another structure of a communication apparatus according to an embodiment of this application. The communication apparatus may be specifically a terminal device. For ease of understanding and illustration, in FIG. 13, a mobile phone is used as an example of the terminal device. As shown in FIG. 13, the terminal device includes a processor, and may further include a memory. In addition, the terminal device may further include a radio frequency circuit, an antenna, an input/output apparatus, and the like. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to: receive data entered by a user, and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, only one memory and one processor are shown in FIG. 13. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the radio frequency circuit and the antenna that has sending and receiving functions may be considered as a transceiver unit of the terminal device, and the processor that has a processing function may be considered as a processing unit of the terminal device. As shown in FIG. 13, the terminal device includes a transceiver unit 1310 and a processing unit 1320. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1310 and that is configured to implement a receiving function may be considered as a receiving unit, and a component that is in the transceiver unit 1310 and that is configured to implement a sending function may be considered as a sending unit. In other words, the transceiver unit 1310 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like. It should be understood that the transceiver unit 1310 is configured to perform a sending operation and a receiving operation on a terminal device side in the foregoing method embodiment, and the processing unit 1320 is configured to perform an operation other than the receiving operation and the sending operation of the terminal device in the foregoing method embodiment.

An embodiment of this application further provides a chip system, including a processor. The processor is coupled to a memory. The memory is configured to store a program or instructions, and when the program or the instructions are executed by the processor, the chip system is enabled to implement the method in any method embodiment described above.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be respectively disposed on different chips. A type of the memory and a manner of disposing the memory and the processor are not specifically limited in this application.

For example, the chip system may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller device (PLD), or another integrated chip.

It should be understood that steps in the foregoing method embodiment may be implemented by using a hardware integrated logical circuit in the processor or instructions in a form of software. The steps of the method disclosed with reference to the embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any method embodiment described above.

An embodiment of this application further provides a computer program product. When a computer reads and executes the computer program product, the computer is enabled to perform the method in any method embodiment described above.

An embodiment of this application further provides a communication system. The communication system includes a first terminal device and a second terminal device. Optionally, the communication system may further include a network device.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative descriptions, many forms of RAMs may be used, for example, a static random access memory (SRAM), a dynamic random access memory (DRAM), a synchronous dynamic random access memory (SDRAM), a double data rate SDRAM (DDR SDRAM), an enhanced SDRAM (ESDRAM), a synchlink DRAM (SLDRAM), and a direct rambus RAM (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on implementation processes of the embodiments of the present invention.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described systems, apparatuses, and units, refer to a corresponding process in the foregoing method embodiment.

In the several embodiments provided in this application, it should be understood that the disclosed systems, apparatuses, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    mapping, by a first apparatus, first control information to a first transmission resource, the first control information indicating a size of a transmission resource occupied by second control information;
    mapping, by the first apparatus, the second control information to a second transmission resource, wherein the second control information is at a forepart of second information, and the second information is a coded bit sequence obtained by multiplexing a first output of channel coding performed on the second control information and a second output of channel coding performed on data,
    wherein the first control information is carried on a physical sidelink control channel (PSCCH), the second control information is carried on a physical sidelink shared channel (PSSCH) on which the data is carried, the first transmission resource and the second transmission resource are in a same slot in the time domain, and wherein the second transmission resource and the first transmission resource are non-overlapping in the time domain; and
    sending, by the first apparatus, the first control information and the second information to a second apparatus.

2. The method according to claim 1,
    wherein the coded bit sequence is represented as: $g_0, g_1, g_2, \ldots, g_{G-1}$,
    wherein when $0 \le i < L_{2nd\text{-}SCI}$, $g_i = q_i$,
    wherein when $L_{2nd\text{-}SCI} \le i \le G-1$, $g_i = f_{i-L_{2nd\text{-}SCI}}$,
    wherein $G = L_{2nd\text{-}SCI} + M_{data}$, wherein $L_{2nd\text{-}SCI}$ is a number of code blocks output through the channel coding performed on the second control information, and wherein $M_{data}$ is a number of code blocks output through the channel coding performed on the data,
    wherein the first output of the channel coding performed on the second control information is represented as $q_0, q_1, q_2, \ldots, q_{L_{2nd\text{-}SCI}-1}$, and
    wherein the second output of the channel coding performed on the data is represented as $f_0, f_1, f_2, \ldots, f_{M_{data}-1}$.

3. The method according to claim 1, wherein the first transmission resource occupies an $n^{th}$ symbol to an $(n+k)^{th}$ symbol in the same slot, a time domain start symbol of the second transmission resource is an $(n+k+1)^{th}$ symbol in the same slot, n is 0 or 1, and k is a positive integer.

4. The method according to claim 1, wherein the mapping the second control information to the second transmission resource comprises:
    mapping, by the first apparatus, the second control information to the second transmission resource in the frequency domain in an ascending order of sequence numbers of resource blocks and subsequently in the time domain in an ascending order of sequence numbers of symbols.

5. The method according to claim 1, wherein the mapping the first control information to the first transmission resource comprises:
   mapping, by the first apparatus, the first control information to the first transmission resource starting from a second symbol in the same slot.

6. The method according to claim 1, the sending comprising:
   sending, by the first apparatus, the first control information in a broadcast message, a unicast message, or a multicast message; and
   sending, by the first apparatus, the second information in a second unicast message, or a second multicast message.

7. A first apparatus comprising:
   at least one processor;
   at least one memory, wherein the at least one memory stores a computer program for execution by the at least one processor that causes the first apparatus to perform operations comprising:
   mapping first control information to a first transmission resource, the first control information indicating a size of a transmission resource occupied by second control information;
   mapping the second control information to a second transmission resource, wherein the second control information is at a forepart of second information, and the second information is a coded bit sequence obtained by multiplexing a first output of channel coding performed on the second control information and a second output of channel coding performed on data,
   wherein the first control information is carried on a physical sidelink control channel (PSCCH), the second control information is carried on a physical sidelink shared channel (PSSCH) on which the data is carried, the first transmission resource and the second transmission resource are in a same slot in the time domain, and wherein the second transmission resource and the first transmission resource are non-overlapping in the time domain; and
   sending the first control information and the second information to a second apparatus.

8. The first apparatus according to claim 7,
   wherein the coded bit sequence is represented as: $g_0, g_1, g_2, \ldots, g_{G-1}$,
   wherein when $0 \leq i < L_{2nd\text{-}SCI}$, $g_i = q_i$,
   wherein when $L_{2nd\text{-}SCI} \leq i \leq G-1$, $g_i = f_{i-L_{2nd\text{-}SCI}}$,
   wherein $G = L_{2nd\text{-}SCI} + M_{data}$, wherein $L_{2nd\text{-}SCI}$ is a number of code blocks output through the channel coding performed on the second control information, and wherein $M_{data}$ is a number of code blocks output through the channel coding performed on the data,
   wherein the first output obtained through the channel coding performed on the second control information is represented as $q_0, q_1, q_2, \ldots, q_{L_{2nd\text{-}SCI}-1}$, and
   wherein the second output obtained through the channel coding performed on the data is represented as $f_0, f_1, f_2, \ldots, f_{M_{data}-1}$.

9. The first apparatus according to claim 7, wherein the first transmission resource occupies an $n^{th}$ symbol to an $(n+k)^{th}$ symbol in the same slot, a time domain start symbol of the second transmission resource is an $(n+k+1)^{th}$ symbol in the same slot, n is 0 or 1, and k is a positive integer.

10. The first apparatus according to claim 7, wherein the mapping the second control information to the second transmission resource comprises:
   mapping the second control information to the second transmission resource in the frequency domain in an ascending order of sequence numbers of resource blocks and subsequently in the time domain in an ascending order of sequence numbers of symbols.

11. The first apparatus according to claim 7, wherein the mapping the first control information to the first transmission resource comprises:
   mapping the first control information to the first transmission resource starting from a second symbol in the same slot.

12. The first apparatus according to claim 7, the sending comprising:
   sending the first control information in a broadcast message, a unicast message, or a multicast message; and
   sending the second information in a second unicast message, or a second multicast message.

13. A non-transitory computer-readable storage medium comprising instructions which, when executed by at least one processor, cause a first apparatus to perform operations comprising:
   mapping first control information to a first transmission resource, the first control information indicating a size of a transmission resource occupied by second control information;
   mapping the second control information to a second transmission resource, wherein the second control information is at a forepart of second information, and the second information is a coded bit sequence obtained by multiplexing a first output of channel coding performed on the second control information and a second output of channel coding performed on data,
   wherein the first control information is carried on a physical sidelink control channel (PSCCH), the second control information is carried on a physical sidelink shared channel (PSSCH) on which the data is carried, the first transmission resource and the second transmission resource are located in a same slot in the time domain, and wherein the second transmission resource and the first transmission resource are non-overlapping in the time domain; and
   sending the first control information and the second information to a second apparatus.

14. The non-transitory computer-readable storage medium according to claim 13,
   wherein the coded bit sequence is represented as: $g_0, g_1, g_2, \ldots, g_{G-1}$,
   wherein when $0 \leq i < L_{2nd\text{-}SCI}$, $g_i = q_i$,
   wherein when $L_{2nd\text{-}SCI} \leq i \leq G-1$, $g_i = f_{i-L_{2nd\text{-}SCI}}$,
   wherein $G = L_{2nd\text{-}SCI} + M_{data}$, wherein $L_{2nd\text{-}SCI}$ is a number of code blocks output through the channel coding performed on the second control information, and wherein $M_{data}$ is a number of code blocks output through the channel coding performed on the data,
   wherein the first output obtained through the channel coding performed on the second control information is represented as $q_0, q_1, q_2, \ldots, q_{L_{2nd\text{-}SCI}-1}$, and
   wherein the second output obtained through the channel coding performed on the data is represented as $f_0, f_1, f_2, \ldots, f_{M_{data}-1}$.

15. The non-transitory computer-readable storage medium according to claim 13, wherein the first transmission resource occupies an $n^{th}$ symbol to an $(n+k)^{th}$ symbol in the same slot, a time domain start symbol of the second transmission resource is an $(n+k+1)^{th}$ symbol in the same slot, n is 0 or 1, and k is a positive integer.

16. The non-transitory computer-readable storage medium according to claim 13, wherein the mapping the second control information to the second transmission resource comprises:
- mapping the second control information to the second transmission resource in the frequency domain in an ascending order of sequence numbers of resource blocks and subsequently in the time domain and in an ascending order of sequence numbers of symbols.

17. The non-transitory computer-readable storage medium according to claim 13, wherein the mapping the first control information to the first transmission resource comprises:
- mapping the first control information to the first transmission resource starting from a second symbol in the same slot.

* * * * *

UNITED STATES PATENT AND TRADEMARK OFFICE
CERTIFICATE OF CORRECTION

PATENT NO. : 12,301,502 B2
APPLICATION NO. : 17/651134
DATED : May 13, 2025
INVENTOR(S) : Guo et al.

It is certified that error appears in the above-identified patent and that said Letters Patent is hereby corrected as shown below:

In the Specification

In Column 13, Line 36, delete "$b_1$," and insert -- $b_j$, --.

In Column 13, Line 39, delete "$a_t$" and insert -- $a_i$ --.

In Column 13, Line 42, delete "$a_t$" and insert -- $a_i$ --.

In Column 14, Line 14, delete "boa," and insert -- 10a, --.

In Column 14, Line 14, delete "bob," and insert -- 10b, --.

In the Claims

In Column 20, in Claim 2, Line 41, delete "$g_1=q_1$," and insert -- $g_i=q_i$, --.

In Column 20, in Claim 2, Line 42, delete "$\leq 1 \leq G-1$, $g_1$" and insert -- $\leq i \leq G-1$, $g_i$ --.

In Column 20, in Claim 2, Line 50, delete "$q_{L_{2nd-SCI-1'}}$" and insert -- $q_{L_{2nd-SCI-1'}}$ --.

In Column 20, in Claim 2, Line 53, delete "$f_{M_{data}}^{-1}$" and insert -- $f_{M_{data}-1}$ --.

In Column 21, in Claim 8, Line 56, delete "$q_{L_{2nd-SCI}}^{-1}$," and insert -- $q_{L_{2nd-SCI-1'}}$ --.

In Column 21, In Claim 8, Line 59, delete "$f_{M_{data}}^{-1}$" and insert -- $f_{M_{data}-1}$ --.

Signed and Sealed this
Twenty-ninth Day of July, 2025

Coke Morgan Stewart
*Acting Director of the United States Patent and Trademark Office*

CERTIFICATE OF CORRECTION (continued)
U.S. Pat. No. 12,301,502 B2

In Column 22, in Claim 14, Line 50, delete "$\leq 1 \leq G-1,$" and insert -- $\leq i \leq G-1,$ --.

In Column 22, in Claim 14, Line 58, delete "$q_{L_{2nd-SCI}}^{-1},$" and insert -- $q_{L_{2nd-SCI}-1},$ --.

In Column 22, In Claim 14, Line 61, delete "$f_{M_{data-1}} \cdot,$" and insert -- $f_{M_{data}-1} \cdot$ --.